(12) United States Patent
Jones

(10) Patent No.: US 7,750,097 B2
(45) Date of Patent: Jul. 6, 2010

(54) POLYMERIZATION CATALYSTS, MAIN GROUP COORDINATION COMPOUNDS, PROCESS FOR PREPARING POLYOLEFINS AND POLYOLEFINS

(75) Inventor: Robert L. Jones, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 789 days.

(21) Appl. No.: 11/631,683

(22) PCT Filed: Jun. 30, 2005

(86) PCT No.: PCT/EP2005/007057

§ 371 (c)(1),
(2), (4) Date: Jan. 5, 2007

(87) PCT Pub. No.: WO2006/002923

PCT Pub. Date: Jan. 12, 2006

(65) Prior Publication Data

US 2008/0021182 A1    Jan. 24, 2008

Related U.S. Application Data

(60) Provisional application No. 60/598,514, filed on Aug. 3, 2004.

(30) Foreign Application Priority Data

Jul. 5, 2004    (DE) ..................... 10 2004 032 581

(51) Int. Cl.
*C08F 4/52* (2006.01)
*C08F 4/00* (2006.01)
*B01J 31/14* (2006.01)
*B01J 31/18* (2006.01)
*B01J 31/22* (2006.01)

(52) U.S. Cl. .................. 526/220; 526/217; 502/167

(58) Field of Classification Search ............... 502/167, 502/168, 171; 526/217, 220
See application file for complete search history.

(56) References Cited

U.S. PATENT DOCUMENTS

| 6,316,130 | B1 | 11/2001 | Heuer et al. |
| 6,417,302 | B1 | 7/2002 | Bohnen |
| 6,521,561 | B1 * | 2/2003 | Jacobsen et al. ............ 502/162 |
| 6,589,905 | B1 | 7/2003 | Fischer et al. |
| 6,812,185 | B2 | 11/2004 | Fischer et al. |
| 7,053,160 | B1 | 5/2006 | Bingel et al. |

FOREIGN PATENT DOCUMENTS

| EP | 525938 | 2/1993 |
| WO | 91/09882 | 7/1991 |
| WO | 96/00243 | 1/1996 |
| WO | 98/40419 | 9/1998 |
| WO | 99/06414 | 2/1999 |
| WO | 99/56699 | 11/1999 |
| WO | 00/00496 | 1/2000 |
| WO | 00/00525 | 1/2000 |
| WO | 00/05277 | 2/2000 |
| WO | 00/31090 | 6/2000 |

OTHER PUBLICATIONS

M. Coles, "Cationic Aluminum Alkyl Complexes Incorporating Amidinate Ligands. Transition-Metal-Free Ethylene Polymerization Catalysts," *J. Am. Chem. Soc.*, vol. 119(34), p. 8125-8126 (1997).

H. Sugimoto et al., "Lewis Acid-Assisted Anionic Ring-Opening Polymerization of Epoxide by the Aluminum Complexes of Porphyrin, Phthalocyanine, Tetraazaannulene, and Schiff Base as Initiators," *Macromolecules*, vol. 27(8), p. 2013-2018 (1994) XP-002344881.

K. Kawakami et al., "*cis-trans* Isomerisation of Dimethyltin Bis-(Salicylaldehyde)-Ethylene-diiminate," *Journal of Organometallic Chemistry*, vol. 70(1), p. 67-77 (1974) XP-002344882.

* cited by examiner

*Primary Examiner*—Caixia Lu
(74) *Attorney, Agent, or Firm*—Jarrod N. Raphael

(57) ABSTRACT

The present invention relates to catalyst systems for preparing isotactic polyolefins which are obtained by reacting at least one chiral coordination compound of a main group element selected from the group of elements consisting of Al, Si, P, S, Ga, Ge, As, Se, In, Sn, Sb, Te, Tl, Pb, Bi and Po as central atom and at least one cocatalyst which is able to convert the chiral coordination compound into a species which displays polymerization activity toward at least one olefin, with the chiral coordination compound comprising two bidentate chelating ligands joined to one another via a bridge and, optionally, one or two further monodentate ligands and with the four coordinating atoms of the two chelating ligands surrounding the main group element as central atom of the coordination compound in an approximately planar fashion and up to two further ligands being located above and below this approximately planar coordination sphere formed by the four coordinating atoms of the two chelating ligands and, in the case of two such further ligands, these being in trans positions relative to one another.

7 Claims, 1 Drawing Sheet

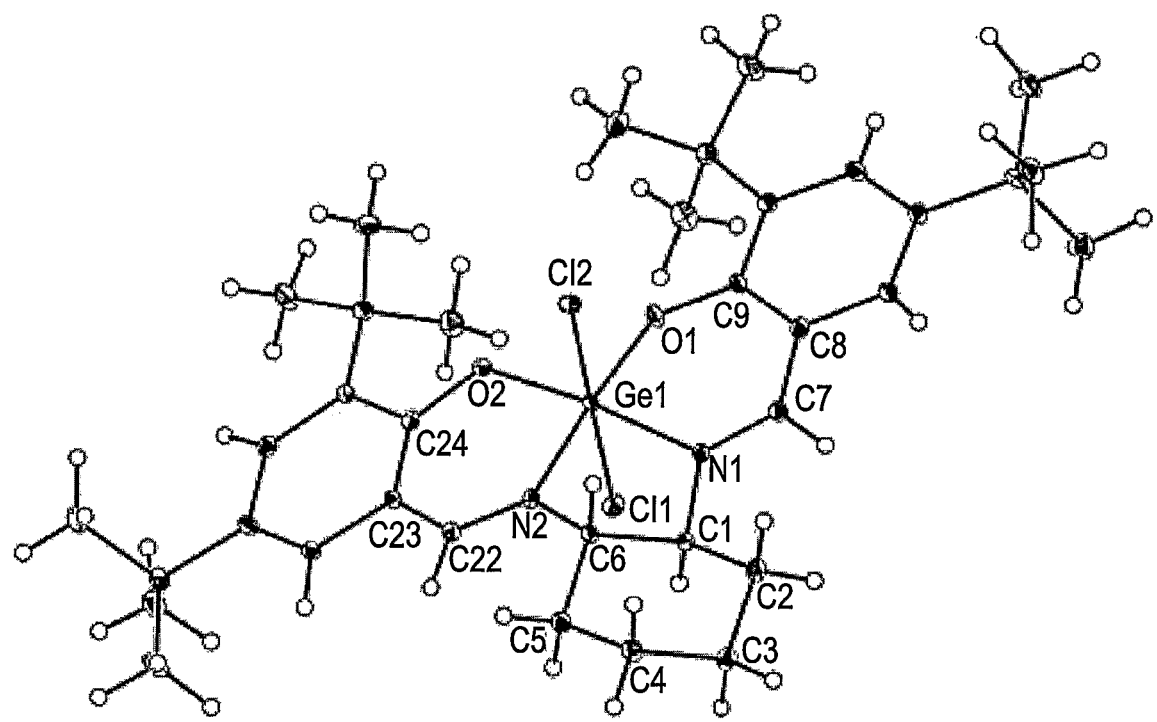

POLYMERIZATION CATALYSTS, MAIN GROUP COORDINATION COMPOUNDS, PROCESS FOR PREPARING POLYOLEFINS AND POLYOLEFINS

The present invention relates to catalyst systems for preparing isotactic polyolefins which are obtainable by reacting at least one chiral coordination compound of a main group element selected from the group of elements consisting of Al, Si, P, S, Ga, Ge, As, Se, In, Sn, Sb, Te, Tl, Pb, Bi and Po as central atom and at least one cocatalyst which is able to convert the chiral coordination compound into a species which displays polymerization activity toward at least one olefin, with the chiral coordination compound comprising two bidentate chelating ligands joined to one another via a bridge and, if appropriate, one or two further monodentate ligands and with the four coordinating atoms of the two chelating ligands surrounding the main group element as central atom of the coordination compound in an approximately planar fashion and up to two further ligands being located above and below this approximately planar coordination sphere formed by the four coordinating atoms of the two chelating ligands and, in the case of two such further ligands, these being in trans positions relative to one another.

In addition, the present invention relates to the use of the catalyst systems of the invention for preparing polyolefins, a process for preparing polyolefins by polymerization or copolymerization of at least one olefin in the presence of one of the catalyst systems of the invention, the use of chiral coordination compounds of a main group element for preparing a catalyst system for the polymerization of olefins, chiral coordination compounds of a main group element, a process for preparing a catalyst system for olefin polymerization, a process for preparing isotactic polyolefins, polyolefins obtainable by a process according to the invention, polyolefin compositions comprising the polyolefins of the invention and also articles produced from such polyolefin compositions.

Research and development on the use of organic transition metal compounds, in particular metallocenes, as catalyst components for the polymerization and copolymerization of olefins with the objective of preparing tailored polyolefins has been persued intensively at universities and in industry over the past 15 years.

Now, apart from the metallocenes, new classes of transition metal compounds containing no cyclopentadienyl ligands are increasingly being examined as catalyst components.

Olefin polymerization catalysts which are free of transition metals are likewise known. Thus, J. Am. Chem. Soc 1997, 119, 8125-8126, describes a cationic aluminum complex for the polymerization of ethylene.

It was an object of the present invention to discover catalyst systems which are based on compounds containing no transition metal and make it possible to prepare highly isotactic polyolefins, in particular isotactic polypropylenes having melting points above 150° C. Furthermore, the catalyst systems should display good activities and be able to be used at industrially relevant polymerization temperatures.

BRIEF DESCRIPTION OF THE DRAWING

FIG. 1 shows the structure of compound (2) of Example 2.

We have accordingly found the catalyst systems mentioned at the outset.

The chiral coordination compound of a main group element comprises a main group element selected from the group of elements consisting of Al, Si, P, S, Ga, Ge, As, Se, In, Sn, Sb, Te, Tl, Pb, Bi and Po, preferably Al, Si, Ga, Ge, As, In, Sn, Sb and Te, particularly preferably Al, Si, Ge and Sn, especially preferably Al, Si and Ge, in particular Ge, as central atom.

The bridge of the chiral coordination compound of a main group element is preferably a chiral bridge, in particular a bridge containing two chiral $sp^3$-hybridized carbon atoms which are each bound directly to one of the two chelating ligands. Particular preference is given to a bridge in which the two chiral $sp^3$-hybridized carbon atoms are bound directly to one another.

Each of the two bidentate chelating ligands is preferably singly negatively charged. The two coordinating atoms of the chelating ligand are, for example, nitrogen, phosphorus, oxygen, sulfur, selenium or tellurium, in particular nitrogen, oxygen or sulfur. Preference is given to at least one, in particular precisely one, of the two coordinating atoms of the bidentate chelating ligand being a nitrogen atom. Particular preference is given to a bidentate chelating ligand having one coordinating nitrogen atom and one coordinating oxygen atom.

Preference is also given to a bidentate chelating ligand which together with the central atom of the coordination compound forms a five-membered or six-membered, in particular six-membered, heterocycle.

Preference is also given to bidentate chelating ligands which are each joined to one another via one of the two coordinating atoms, in particular via a nitrogen atom in each case.

Very particular preference is given to bidentate chelating ligands having an imine function derived from 1,3-dicarbonyl compounds, for example acetylacetone, benzoylacetone or 1,3-diphenyl-1,3-propanedione and also substituted derivatives thereof, or derived from ortho-carbonylphenol derivatives such as 2-hydroxybenzaldehyde or 2-hydroxyacetophenone and also substituted derivatives thereof, with the imine function being formed by reaction of a carbonyl function with a primary amine.

The monodentate ligands are singly negatively charged anions, in particular halide anions such as fluoride, chloride, bromide or iodide anions, in particular chloride anions, hydride anions, $C_1$-$C_{40}$-hydrocarbon anions such as methyl, tert-butyl, vinyl, phenyl or benzyl anions, alkoxy or aryloxy anions such as methoxy or phenoxy anions and amide anions such as dimethylamide anions. Particularly preferred monodentate ligands are chloride, methyl and benzyl anions, in particular chloride anions.

The four coordinating atoms of the two bidentate chelating ligands surround the central atom of the coordination compound in an approximately planar fashion, i.e., in particular, in an approximately square planar fashion. The central atom of the coordination compound does not have to lie exactly in the plane formed by the four coordinating atoms of the two bidentate chelating ligands. For the purposes of the present invention, "approximately planar" means that the four coordinating atoms of the two chelating ligands do not have to lie exactly in a plane, but the two coordinating atoms of the first chelating ligand can instead be slightly twisted relative to the two coordinating atoms of the second chelating ligand. In the present case, the metal ion being surrounded in an approximately planar fashion, in particular an approximately square planar fashion, by the four coordinating atoms of the two chelating ligands means that the angle between the first plane formed by the two coordinating atoms of the first chelating ligand and the central atom of the coordination compound and a second plane formed by the two coordinating atoms of the second chelating ligand and the central atom of the coordination compound is in the range from 0° to 20°, in particular in the range from 0° to 10°.

Preference is given to catalyst systems as described above in which the chiral coordination compound of a main group element is a coordination compound of the formula (I) or an enantiomer thereof of the formula (I*)

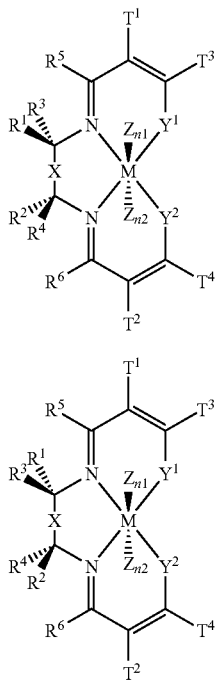

where

M is Al, Si, P, S, Ga, Ge, As, Se, In, Sn, Sb, Te, Tl, Pb, Bi or Po, the radicals Z can be identical or different and are each an organic or inorganic anionic ligand, n1, n2 can be identical or different and are each 0 or 1, with n1+n2+2 corresponding to the valence of M, $R^1$ and $R^2$ can be identical or different and are each a $C_1$-$C_{40}$ radical, or $R^1$ and $R^2$ together with the atoms connecting them form a cyclic or polycyclic ring system which may contain one or more, identical or different heteroatoms selected from the group consisting of the elements N, O, P, S and Si in place of carbon atoms in the ring system, $R^3$ is hydrogen or a $C_1$-$C_{40}$ radical, with $R^3$ displaying lower steric hindrance than $R^1$, $R^4$ is hydrogen or a $C_1$-$C_{40}$ radical, with $R^4$ displaying a lower steric hindrance than $R^2$, $R^5$ and $R^6$ can be identical or different and are each hydrogen or a $C_1$-$C_{40}$ radical, or $R^1$ and $R^3$, $R^2$ and $R^4$, $R^1$ and $R^5$ and/or $R^2$ and $R^6$ together with the atoms connecting them in each case form a cyclic or polycyclic ring system which may contain one or more, identical or different heteroatoms selected from the group consisting of the elements N, O, P, S and Si in place of carbon atoms in the ring system, X represents a single bond between the two carbon atoms or is a divalent group, $Y^1$, $Y^2$ can be identical or different and are each oxygen, sulfur, selenium, tellurium, an $NR^9$ group or a $PR^9$ group, $R^7$, $R^8$, $R^9$ can be identical or different and are each hydrogen, $C_1$-$C_{20}$-alkyl, $C_2$-$C_{20}$-alkenyl, $C_6$-$C_{22}$-aryl, alkylaryl or arylalkyl each having from 1 to 10 carbon atoms in the alkyl radical and from 6 to 22 carbon atoms in the aryl radical, $T^1$, $T^2$, $T^3$ and $T^4$ can be identical or different and are each hydrogen or a $C_1$-$C_{40}$ radical, or $T^1$ and $T^3$ and/or $T^2$ and $T^4$ together with the carbon atoms connecting them in each case form a cyclic or polycyclic ring system which may contain one or more, identical or different heteroatoms selected from the group consisting of the elements N, O, P, S and Si in place of carbon atoms in the ring system.

$M^1$ is Al, Si, P, S, Ga, Ge, As, Se, In, Sn, Sb, Te, Tl, Pb, Bi and Po, preferably Al, Si, Ga, Ge, As, In, Sn, Sb and Te, particularly preferably Al, Si, Ge and Sn, especially preferably Al, Si and Ge, in particular Ge.

The radicals Z can be identical or different, preferably identical, and are each an organic or inorganic anionic ligand. Z is preferably halogen such as fluorine, chlorine, bromine or iodine, in particular chlorine, hydrogen, $C_1$-$C_{20}$-, preferably $C_{1-4}$-alkyl, $C_2$-$C_{20}$-, preferably $C_2$-$C_4$-alkenyl, $C_6$-$C_{22}$-, preferably $C_6$-$C_{10}$-aryl, alkylaryl or arylalkyl each having from 1 to 10, preferably from 1 to 4, carbon atoms in the alkyl radical and from 6 to 22, preferably from 6 to 10, carbon atoms in the aryl radical, —$OR^7$ or —$NR^7R^8$. Z is particularly preferably chlorine or methyl.

n1, n2 can be identical or different and are each 0 or 1, with n1+n2+2 corresponding to the valence of M. Preference is given to n1 and n2 being identical and 1 in the case of the elements of group 4 of the Periodic Table of the Elements, resulting in an oxidation number of +4, and being identical and 0 in the case of the elements of group 10 of the Periodic Table of the Elements, resulting in an oxidation number of +2.

$R^1$ and $R^2$ can be identical or different, preferably identical, and are each a $C_1$-$C_{40}$ radical such as a $C_1$-$C_{40}$-hydrocarbon radical or $C_3$-$C_{40}$—$Si(R^7)_3$, or $R^1$ and $R^2$ together with the atoms connecting them form a cyclic or polycyclic ring system which may contain one or more, identical or different heteroatoms selected from the group consisting of the elements N, O, P, S and Si, preferably N, O or S, in particular N, in place of carbon atoms in the ring system. Preference is given to $R^1$ and $R^2$ each being a cyclic, branched or unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated, or $C_3$-$C_{18}$-, preferably $C_3$-$C_8$—$Si(R^7)_3$, or $R^1$ and $R^2$ together with the atoms connecting them forming a cyclic 4- to 8-membered, preferably 5- or 6-membered, ring system which may in turn bear $C_1$-$C_{20}$ radicals. Particular preference is given to $R^1$ and $R^2$ each being a cyclic, branched or unbranched $C_1$-$C_8$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical or trimethylsilyl or $R^1$ and $R^2$ together with the atoms connecting them forming a cyclic 5- or 6-membered ring system which may in turn bear cyclic, branched or unbranched $C_1$-$C_8$-alkyl radicals, $C_6$-$C_{10}$-aryl radicals, alkylaryl or arylalkyl radicals having from 1 to 4 carbon atoms in the alkyl radical and from 6 to 10 carbon atoms in the aryl radical or trimethylsilyl radicals. Examples of particularly preferred radicals $R^1$ and $R^2$ are methyl, ethyl, n-propyl, isopropyl, n-butyl, i-butyl, s-butyl, t-butyl, n-pentyl, cyclopentyl, n-hexyl, cyclohexyl, n-heptyl, n-octyl, benzyl, 2-phenylethyl, phenyl, 2-tolyl, 3-tolyl, 4-tolyl, 2,3-dimethylphenyl, 2,4-dimethylphenyl, 2,5-dimethylphenyl, 2,6-dimethylphenyl, 3,4-dimethylphenyl, 3,5-dimethylphenyl, 3,5-di(tert-butyl)phenyl, 2,4,6-trimethylphenyl, 2,3,4-trimethylphenyl, 1-naphthyl, 2-naphthyl, phenanthryl, p-isopropylphenyl, p-tert-butylphenyl, p-s-butylphenyl, p-cyclohexylphenyl and p-trimethylsilylphenyl. Examples of particularly preferred ring systems formed from the radicals $R^1$, $R^2$ and the atoms connecting them are 1,2-cyclohexylene, 1,2-cyclopentylene and 1-benzylpyrrolidin-3,4-ylene.

$R^3$ is hydrogen or a $C_1$-$C_{40}$ radical such as a $C_1$-$C_{40}$-hydrocarbon radical or $C_3$-$C_{40}$—$Si(R^7)_3$, with $R^3$ displaying lower steric hindrance than $R^1$. $R^3$ is preferably hydrogen, a cyclic, branched or unbranched, in particular unbranched, $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical, preferably an arylalkyl radical, having from 1 to 10, preferably from 1 to 4, carbon atoms in the alkyl radical and from 6 to 22, preferably from 6 to 10, carbon atoms in the aryl radical, with the radicals also being able to be halogenated. $R^3$ is particularly preferably hydrogen or an unbranched $C_1$-$C_8$-alkyl radical. $R^3$ is very particularly preferably hydrogen.

$R^4$ is hydrogen or a $C_1$-$C_{40}$ radical such as a $C_1$-$C_{40}$-hydrocarbon radical or $C_3$-$C_{40}$—$Si(R^7)_3$, with $R^4$ displaying lower steric hindrance than $R^2$. $R^4$ is preferably hydrogen, a cyclic, branched or unbranched, in particular unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical, preferably an arylalkyl radical, having from 1 to 10, preferably from 1 to 4, carbon atoms in the alkyl radical and from 6 to 22, preferably from 6 to 10, carbon atoms in the aryl radical, with the radicals also being able to be halogenated. $R^4$ is particularly preferably hydrogen or an unbranched $C_1$-$C_8$-alkyl radical. $R^4$ is very particularly preferably hydrogen.

The steric hindrance displayed by a radical is determined by the degree to which it fills space. For example, steric hindrance increases in the following order:

hydrogen<methyl<ethyl<isopropyl<tert-butyl $R^5$ and $R^6$ can be identical or different, in particular identical, and are each hydrogen or a $C_1$-$C_{40}$ radical. $R^5$ and $R^6$ are preferably hydrogen, a cyclic, branched or unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also be able to be halogenated. $R^5$ and $R^6$ are particularly preferably hydrogen, a cyclic, branched or unbranched $C_1$-$C_8$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical. Examples of particularly preferred radicals $R^5$ and $R^6$ are hydrogen, methyl, ethyl, n-propyl, isopropyl, n-butyl, i-butyl, s-butyl, t-butyl, n-pentyl, cyclopentyl, n-hexyl, cyclohexyl, n-heptyl, n-octyl, benzyl, 2-phenylethyl, phenyl, pentafluorophenyl, 2-tolyl, 3-tolyl, 4-tolyl, 2,3- dimethylphenyl, 2,4-dimethylphenyl, 2,5-dimethylphenyl, 2,6-dimethylphenyl, 3,4-dimethylphenyl, 3,5-dimethylphenyl, 3,5-di(tert-butyl)phenyl, 2,4,6-trimethylphenyl, 2,3,4-trimethylphenyl, 1-naphthyl, 2-naphthyl, phenanthryl, p-isopropylphenyl, p-tert-butylphenyl, p-s-butylphenyl, p-cyclohexylphenyl and p-trimethylsilylphenyl, in particular hydrogen.

Furthermore, two radicals $R^1$ and $R^3$, $R^2$ and $R^4$, $R^1$ and $R^5$ and/or $R^2$ and $R^6$ together with the atoms connecting them may also in each case form a cyclic or polycyclic ring system which may contain one or more, identical or different heteroatoms selected from the group consisting of the elements N, O, P, S and Si, in particular N, O and S, in place of carbon atoms in the ring system.

X represents a single bond between the two carbon atoms or is a divalent group. Examples of divalent groups X are $CR^7R^8$, in particular $CH_2$, $CR^7R^8$—$CR^7R^8$, in particular $CH_2$—$CH_2$, $(CR^7R^8)_3$, $(CR^7R^8)_4$ or $(CR^7R^8)_5$. X preferably represents a single bond or $CH_2$, in particular a single bond.

$Y^1$ and $Y^2$ can be identical or different, in particular identical, and are each oxygen, sulfur, selenium, tellurium, an $NR^9$ group or a $PR^9$ group, in particular oxygen.

$R^7$, $R^8$ and $R^9$ can be identical or different and are each hydrogen, $C_1$-$C_{20}$-, preferably $C_1$-$_4$-alkyl, $C_2$-$C_{20}$-, preferably $C_2$-$C_4$-alkenyl, $C_6$-$C_{22}$-, preferably $C_6$-$C_{10}$-aryl, alkylaryl or arylalkyl having from 1 to 10, preferably from 1 to 4, carbon atoms in the alkyl radical and from 6 to 22, preferably from 6 to 10, carbon atoms in the aryl radical.

$T^1$, $T^2$, $T^3$ and $T^4$ can be identical or different and are each hydrogen or a $C_1$-$C_{40}$ radical, or $T^1$ and $T^3$ and/or $T^2$ and $T^4$ together with the carbon atoms connecting them in each case form a cyclic or polycyclic ring system which may contain one or more, identical or different heteroatoms selected from the group consisting of the elements N, O, P, S and Si in place of carbon atoms in the ring system. Preference is given to $T^1$, $T^2$, $T^3$ and $T^4$ each being a cyclic, branched or unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated, or $T^1$ and $T^3$ and/or $T^2$ and $T^4$ together with the carbon atoms connecting them in each case forming substituted or unsubstituted, aromatic or partially hydrogenated 5- to 8-membered, in particular 5- or 6-membered, ring systems which may contain heteroatoms selected from the group consisting of O, S and N and may in turn be constituents of larger polycyclic ring systems. Particular preference is given to $T^1$ and $T^3$ and $T^2$ and $T^4$ together with the two connecting carbon atoms forming substituted or unsubstituted phenyl rings, thiophene rings or pyrrole rings, in particular phenyl rings, which may in turn be constituents of larger polycyclic ring systems.

According to the invention the radicals $R^1$, $R^2$, $R^3$, $R^4$, $R^5$, $R^6$, $R^7$, $R^8$, $R^9$, $T^1$, $T^2$, $T^3$ and $T^4$ can also contain functional groups without altering the polymerization properties of the catalyst system of the invention, as long as these functional groups are chemically inert under the polymerization conditions.

Furthermore, the substituents according to the present invention are, unless restricted further, defined as follows:

The term "$C_1$-$C_{40}$ radical" as used in the present text refers to $C_1$-$C_{40}$-alkyl radicals, $C_1$-$C_{10}$-fluoroalkyl radicals, $C_1$-$C_{12}$-alkoxy radicals, saturated $C_3$-$C_{20}$-heterocyclic radicals, $C_6$-$C_{40}$-aryl radicals, $C_2$-$C_{40}$-heteroaromatic radicals, $C_6$-$C_{10}$-fluoroaryl radicals, $C_6$-$C_{10}$-aryloxy radicals, $C_3$-$C_{18}$-trialkylsilyl radicals, $C_2$-$C_{20}$-alkenyl radicals, $C_2$-$C_{20}$-alkynyl radicals, $C_7$-$C_{40}$-arylalkyl radicals or $C_8$-$C_{40}$-arylalkenyl radicals.

The term "alkyl" as used in the present text encompasses linear or singly or multiply branched saturated hydrocarbons which may also be cyclic. Preference is given to a $C_1$-$C_{18}$-alkyl, such as methyl, ethyl, n-propyl, n-butyl, n-pentyl, n-hexyl, n-heptyl, n-octyl, n-nonyl, n-decyl, cyclopentyl or cyclohexyl, isopropyl, isobutyl, isopentyl, isohexyl, sec-butyl or tert-butyl.

The term "alkenyl" as used in the present text encompasses linear or singly or multiply branched hydrocarbons having one or more C—C double bonds which may be cumulated or alternating.

The term "saturated heterocyclic radical" as used in the present text refers to monocyclic or polycyclic, substituted or unsubstituted hydrocarbon radicals in which one or more carbon atoms, CH groups and/or CH$_2$ groups have been replaced by heteroatoms selected from the group consisting of O, S, N and P. Preferred examples of substituted or unsubstituted saturated heterocyclic radicals are pyrrolidinyl, imidazolidinyl, pyrazolidinyl, piperidyl, piperazinyl, morpholinyl, tetrahydrofuranyl, tetrahydropyranyl, tetrahydrothiophenyl and the like, and also methyl-, ethyl-, propyl-, isopropyl- and tert-butyl-substituted derivatives thereof.

The term "aryl" as used in the present text refers to aromatic and if appropriate also fused polyaromatic hydrocarbon substituents which may optionally be monosubstituted or polysubstituted by linear or branched $C_1$-$C_{18}$-alkyl, $C_1$-$C_{18}$-alkoxy, $C_2$-$C_{10}$-alkenyl or $C_3$-$C_{15}$-alkylalkenyl. Preferred examples of substituted and unsubstituted aryl radicals are, in particular, phenyl, pentafluorophenyl, 4-methylphenyl, 4-ethylphenyl, 4-propylphenyl, 4-isopropylphenyl, 4-tert-butylphenyl, 4-methoxyphenyl, 1-naphthyl, 9-anthryl, 9-phenanthryl, 3,5-dimethylphenyl, 3,5-di-tert-butylphenyl and 4-trifluoromethylphenyl.

The term "heteroaromatic radical" as used in the present text refers to aromatic hydrocarbon substituents in which one or more carbon atoms have been replaced by nitrogen, phosphorus, oxygen or sulfur atoms or combinations thereof. These can, like the aryl radicals, optionally be monosubstituted or polysubstituted by linear or branched $C_1$-$C_{18}$-alkyl, $C_2$-$C_{10}$-alkenyl or $C_3$-$C_{15}$-alkylalkenyl. Preferred examples are furyl, thienyl, pyrrolyl, pyridyl, pyrazolyl, imidazolyl, oxazolyl, thiazolyl, pyrimidinyl, pyrazinyl and the like, and also methyl-, ethyl-, propyl-, isobutyl- and tert-butyl-substituted derivatives thereof.

The term "alkylalkenyl" as used in the present text encompasses linear or singly or multiply branched hydrocarbons having one or more C—C double bonds which are isolated, so that the substituent has both alkyl and alkenyl sections.

The term "arylalkyl" as used in the present text refers to aryl-containing substituents whose aryl radical is linked via an alkyl chain to the remainder of the molecule. Preferred examples are benzyl, substituted benzyl, phenethyl, substituted phenethyl and the like.

Fluoroalkyl and fluoroaryl are organic radicals in which at least one, preferably more than one and a maximum of all hydrogen atoms have been replaced by fluorine atoms. Examples of fluorine-containing organic radicals which are preferred according to the invention are trifluoromethyl, 2,2,2-trifluoroethyl, pentafluorophenyl, 4-trifluoromethylphenyl, 4-perfluoro-tert-butylphenyl and the like.

Particular preference is given to catalyst systems as described above in which the chiral coordination compound of a main group element of the formula (I) or (I*) is a coordination compound of the formula (Ia) or an enantiomer thereof of the formula (Ia*),

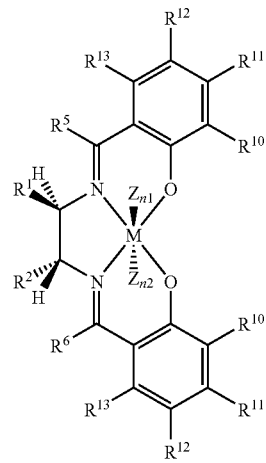

(Ia)

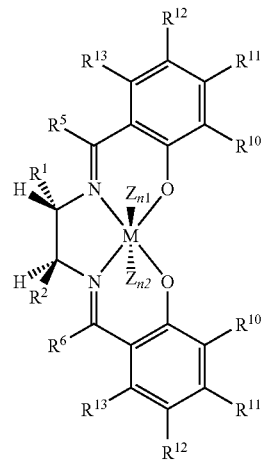

(Ia*)

where
M is Al, Si, Ga, Ge, As, In, Sn, Sb or Te,
the radicals Z can be identical or different and are each halogen, hydrogen, $C_1$-$C_{10}$-alkyl, $C_6$-$C_{14}$-aryl, alkylaryl or arylalkyl having from 1 to 4 carbon atoms in the alkyl radical and from 6 to 10 carbon atoms in the aryl radical,
n1, n2 can be identical or different and are each 0 or 1, with n1+n2+2 corresponding to the valence of M,
$R^1$ and $R^2$ can be identical or different and are each a $C_1$-$C_{40}$ radical, or $R^1$ and $R^2$ together with the atoms connecting them form a cyclic or polycyclic ring system which may contain one or more, identical or different heteroatoms selected from the group consisting of the elements N, O, P, S and Si in place of carbon atoms in the ring system,
$R^5$ and $R^6$ are identical and are each hydrogen or a $C_1$-$C_{40}$ radical,
$R^{10}$, $R^{11}$, $R^{12}$ and $R^{13}$ can be identical or different and are each hydrogen, halogen or a $C_1$-$C_{40}$ radical, or two adjacent radicals $R^{10}$, $R^{11}$, $R^{12}$ and $R^{13}$ together with the two carbon atoms connecting them can form a cyclic ring system.

$M^1$ is Al, Si, Ga, Ge, As, In, Sn, Sb or Te, preferably Al, Si, Ge or Sn, particularly preferably Al, Si or Ge, especially preferably Si or Ge, in particular Ge.

The radicals Z can be identical or different, preferably identical, and are each halogen such as fluorine, chlorine, bromine or iodine, in particular chlorine, hydrogen, $C_1$-$C_{10}$-, preferably $C_1$-$_4$-alkyl, $C_6$-$C_{14}$-, preferably $C_6$-$C_{10}$-aryl and alkylaryl or arylalkyl having from 1 to 4 carbon atoms in the alkyl radical and from 6 to 10, preferably 6, carbon atoms in the aryl radical. Z is preferably chlorine, benzyl or methyl, in particular chlorine.

The radicals $R^1$ and $R^2$ can be identical or different, in particular identical, and are each a $C_1$-$C_{40}$ radical such as a $C_1$-$C_{40}$-hydrocarbon radical or $C_3$-$C_{40}$—$Si(R^7)_3$, or $R^1$ and $R^2$ together with the atoms connecting them form a cyclic or polycyclic, in particular monocyclic, ring system which may contain one or more, identical or different heteroatoms selected from the group consisting of the elements N, O, P, S and Si, preferably N, O or S, in particular N, in place of carbon atoms in the ring system. Preference is given to $R^1$ and $R^2$ each being a cyclic, branched or unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated, or $C_3$-$C_{18}$-, preferably $C_3$-$C_8$—$Si(R^7)_3$ or $R^1$ and $R^2$ together with the atoms connecting them forming a cyclic 4- to 8-membered, preferably 5- or 6-membered, ring system which may in turn bear $C_1$-$C_{20}$ radicals. Particular preference is given to $R^1$ and $R^2$ each being a cyclic, branched or unbranched $C_1$-$C_8$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical or trimethylsilyl or $R^1$ and $R^2$ together with the atoms connecting them forming a cyclic 5- or 6-membered ring system which may in turn bear cyclic, branched or unbranched $C_1$-$C_8$-alkyl radicals, $C_6$-$C_{10}$-aryl radicals, alkylaryl or arylalkyl radicals having from 1 to 4 carbon atoms in the alkyl radical and from 6 to 10 carbon atoms in the aryl radical or trimethylsilyl radicals. Examples of particularly preferred radicals $R^1$ and $R^2$ are methyl, ethyl, n-propyl, isopropyl, n-butyl, i-butyl, s-butyl, t-butyl, n-pentyl, cyclopentyl, n-hexyl, cyclohexyl, n-heptyl, n-octyl, benzyl, 2-phenylethyl, phenyl, 2-tolyl, 3-tolyl, 4-tolyl, 2,3-dimethylphenyl, 2,4-dimethylphenyl, 2,5-dimethylphenyl, 2,6-dimethylphenyl, 3,4-dimethylphenyl, 3,5-dimethylphenyl, 3,5-di(tert-butyl)phenyl, 2,4,6-trimethylphenyl, 2,3,4-trimethylphenyl, 1-naphthyl, 2-naphthyl, phenanthryl, p-isopropylphenyl, p-tert-butylphenyl, p-s-butylphenyl, p-cyclohexylphenyl and p-trimethylsilylphenyl. Examples of particularly preferred ring systems formed from the radicals $R^1$, $R^2$ and the atoms connecting them are 1,2-cyclohexylene, 1,2-cyclopentylene and 1-benzylpyrrolidin-3,4-ylene.

The radicals $R^5$ and $R^6$ are identical and are each hydrogen or a $C_1$-$C_{40}$ radical. $R^5$ and $R^6$ are preferably hydrogen, a cyclic, branched or unbranched $C_1$-$C_{20}$-, preferably $C_1$-$C_8$-alkyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated. $R^5$ and $R^6$ are particularly preferably hydrogen, a cyclic, branched or unbranched $C_1$-$C_8$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical. Examples of particularly preferred radicals $R^5$ and $R^6$ are hydrogen, methyl, ethyl, n-propyl, isopropyl, n-butyl, i-butyl, s-butyl, t-butyl, n-pentyl, cyclopentyl, n-hexyl, cyclohexyl, n-heptyl, n-octyl, benzyl, 2-phenylethyl, phenyl, pentafluorophenyl, 2-tolyl, 3-tolyl, 4-tolyl, 2,3-dimethylphenyl, 2,4-dimethylphenyl, 2,5-dimethylphenyl, 2,6-dimethylphenyl, 3,4-dimethylphenyl, 3,5-dimethylphenyl, 3,5-di(tert-butyl)phenyl, 2,4,6-trimethylphenyl, 2,3,4-trimethylphenyl, 1-naphthyl, 2-naphthyl, phenanthryl, p-isopropylphenyl, p-tert-butylphenyl, p-s-butylphenyl, p-cyclohexylphenyl and p-trimethylsilylphenyl, in particular methyl, phenyl or hydrogen, in particular hydrogen.

The radicals $R^7$ can be identical or different and are each $C_{1-4}$-alkyl such as methyl, ethyl or tert-butyl, in particular methyl, $C_6$-$C_{10}$-aryl such as phenyl or naphthyl, in particular phenyl, alkylaryl or arylalkyl having from 1 to 4 carbon atoms in the alkyl radical and from 6 to 10, preferably 6, carbon atoms in the aryl radical.

The radicals $R^{10}$, $R^{11}$, $R^{12}$ and $R^{13}$ can be identical or different and are each hydrogen, halogen such as fluorine, chlorine, bromine or iodine or a $C_1$-$C_{40}$ radical such as a $C_1$-$C_{40}$-hydrocarbon radical or $C_3$-$C_{40}$—$Si(R^7)_3$, or two adjacent radicals $R^{10}$, $R^{11}$, $R^{12}$ and $R^{13}$ together with the two carbon atoms connecting them can form a cyclic ring system which may contain one or more, identical or different heteroatoms selected from the group consisting of the elements N, O, P, S and Si, preferably N, O or S, in place of carbon atoms. Preference is given to the radicals $R^{10}$, $R^{11}$, $R^{12}$ and $R^{13}$ each being hydrogen, fluorine, chlorine, a cyclic, branched or unbranched $C_1$-$C_{20}$-, preferably $C_1$-$C_8$-alkyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated, or $C_3$-$C_{18}$-, preferably $C_3$-$C_8$—$Si(R^7)_3$ or two adjacent radicals $R^{10}$, $R^{11}$, $R^{12}$ and $R^{13}$ together with the two carbon atoms connecting them forming a cyclic 4- to 8-membered, preferably 5- or 6-membered, in particular 6-membered, ring system which may in turn bear $C_1$-$C_{20}$ radicals. Particular preference is given to the radicals $R^{10}$, $R^{11}$, $R^{12}$ and $R^{13}$ each being hydrogen, a cyclic, branched or unbranched $C_1$-$C_8$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical or trimethylsilyl or two adjacent radicals $R^{10}$, $R^{11}$, $R^{12}$ and $R^{13}$ together with the two carbon atoms connecting them forming a cyclic 5- or 6-membered ring system which may in turn bear cyclic, branched or unbranched $C_1$-$C_8$-alkyl radicals, $C_6$-$C_{10}$-aryl radicals, alkylaryl or arylalkyl radicals having from 1 to 4 carbon atoms in the alkyl radical and from 6 to 10 carbon atoms in the aryl radical or trimethylsilyl radicals. Examples of particularly preferred radicals $R^{10}$, $R^{11}$, $R^{12}$ and $R^{13}$ are methyl, ethyl, n-propyl, isopropyl, n-butyl, i-butyl, s-butyl, t-butyl, n-pentyl, cyclopentyl, n-hexyl, cyclohexyl, n-heptyl, n-octyl, adamantyl, benzyl, triphenylmethyl, 1,1-diphenylethyl, 1-methyl-1-phenylethyl, 2-phenylethyl, phenyl, pentafluorophenyl, 2-tolyl, 3-tolyl, 4-tolyl, 2,3-dimethylphenyl, 2,4-dimethylphenyl, 2,5-dimethylphenyl, 2,6-dimethylphenyl, 3,4-dimethylphenyl, 3,5-dimethylphenyl, 3,5-di(tert-butyl)phenyl, 2,4,6-trimethylphenyl, 2,3,4-trimethylphenyl, 1-naphthyl, 2-naphthyl, phenanthryl, p-isopropylphenyl, p-tert-butylphenyl, p-s-butylphenyl, p-cyclohexylphenyl and p-trimethylsilylphenyl. Examples of particularly preferred ring systems formed from two adjacent radicals $R^{10}$, $R^{11}$, $R^{12}$ and $R^{13}$ together with the two carbon atoms connecting them are a phenyl ring, pyrrole ring or thiophene ring, which may bear further substituents.

Radicals $R^{10}$, $R^{11}$, $R^{12}$ and $R^{13}$ having the same indices are preferably the same radicals.

Preference is given to the radical $R^{10}$ not being hydrogen and being a bulky radical such as a branched or cyclic $C_1$-$C_{10}$-alkyl radical, a $C_6$-$C_{10}$-aryl radical, an alkylaryl or arylalkyl radical having from 1 to 4 carbon atoms in the alkyl radical and from 6 to 10 carbon atoms in the aryl radical. Examples of particularly preferred radicals $R^{10}$ are isopropyl, t-butyl, cyclohexyl, adamantyl, triphenylmethyl, 1,1-diphenylethyl, 1-methyl-1-phenylethyl, phenyl, pentafluorophenyl, 3,5-di(tert-butyl)phenyl, 2,4,6-trimethylphenyl, 1-naphthyl, phenanthryl, p-tert-butylphenyl. An example of a particularly preferred ring system formed from the radicals $R^{10}$ and $R^{11}$ together with the two carbon atoms connecting them is a phenyl ring.

Illustrative but not limiting examples of chiral coordination compounds of a main group element as central atom which can be used as constituents of the catalyst systems of the invention are:

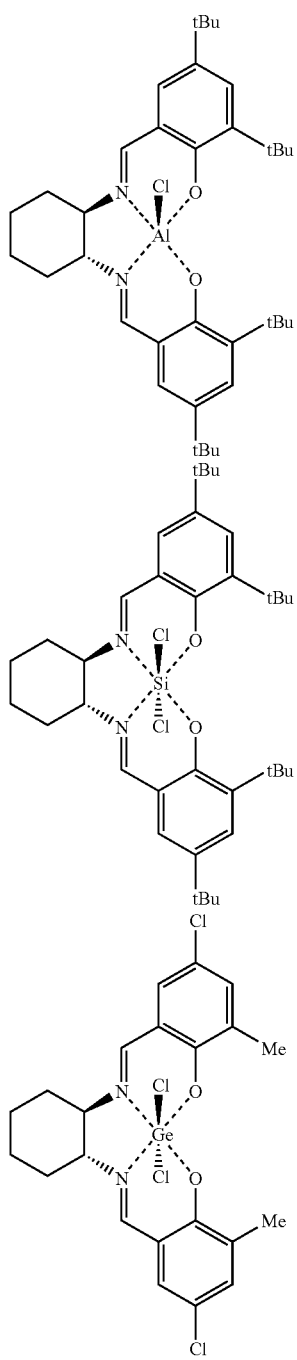

-continued

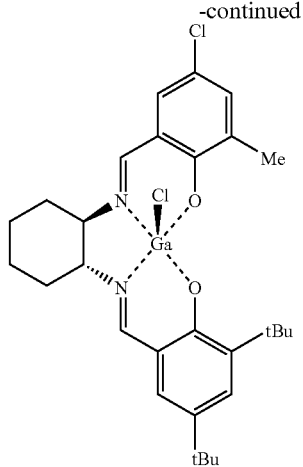

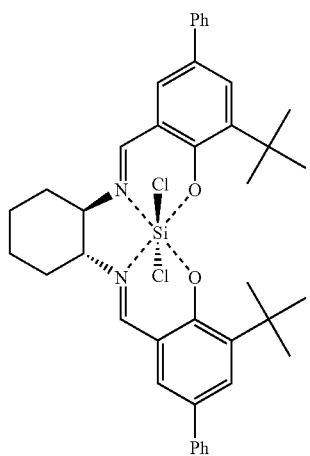

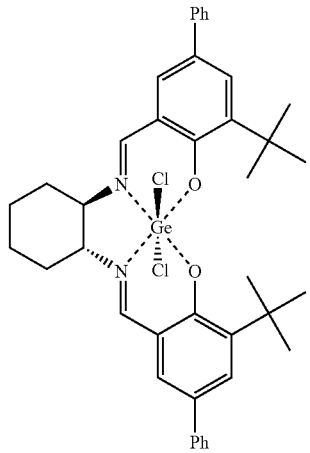

-continued
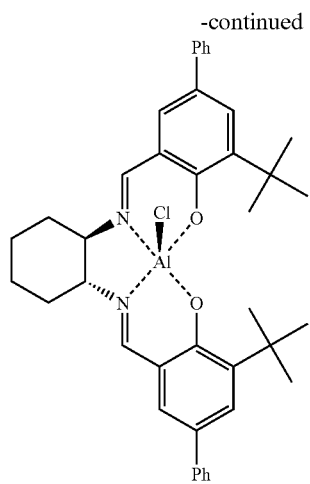
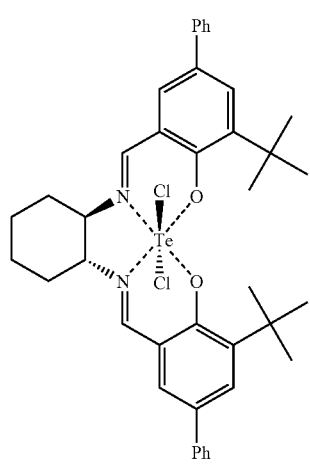
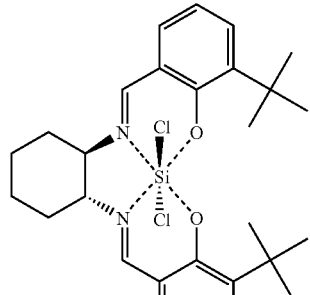
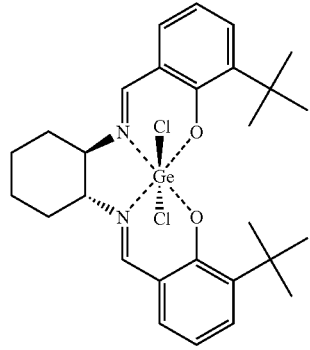
-continued
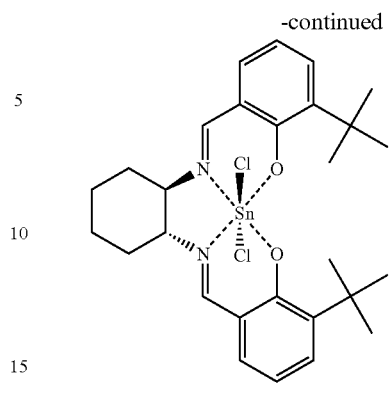
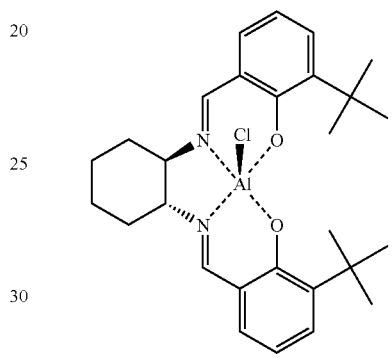
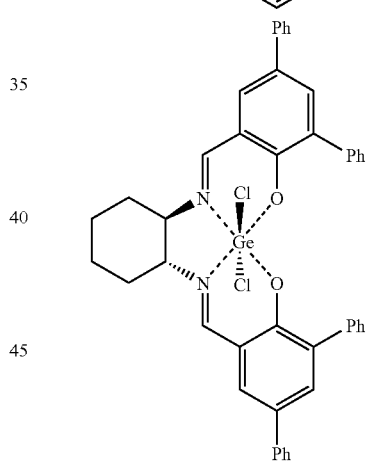
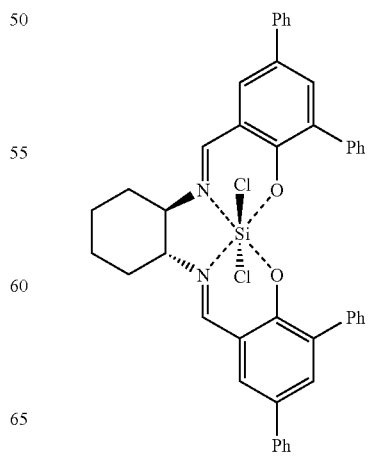

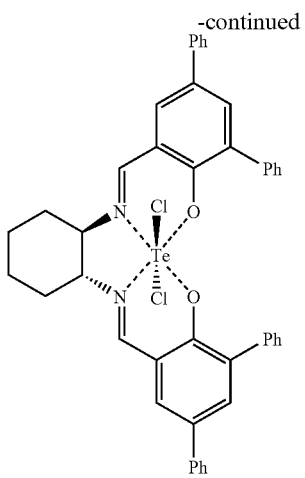
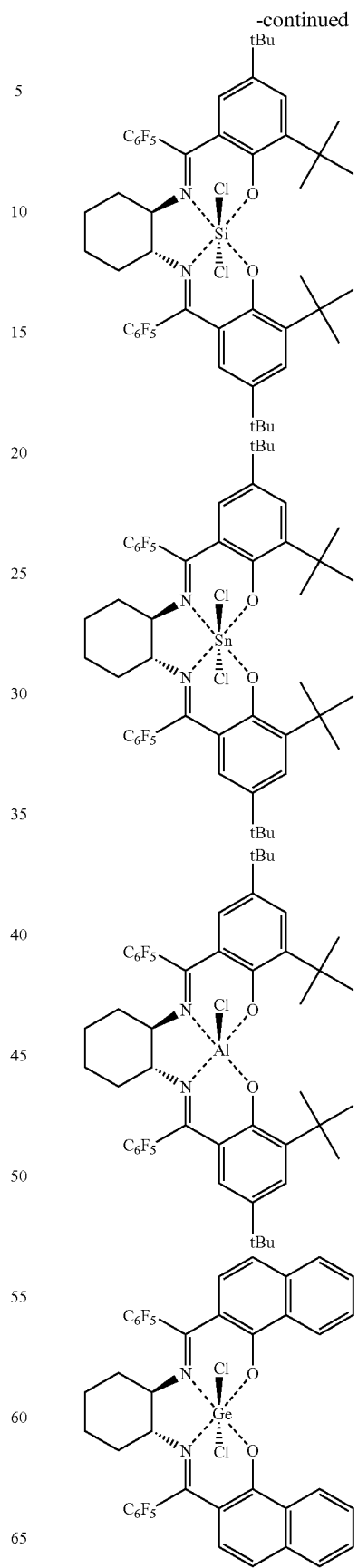

-continued
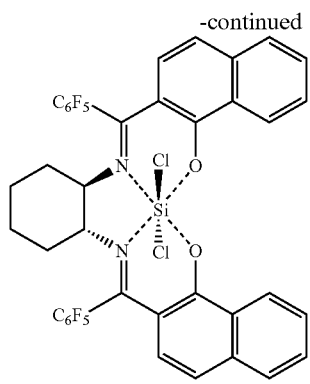
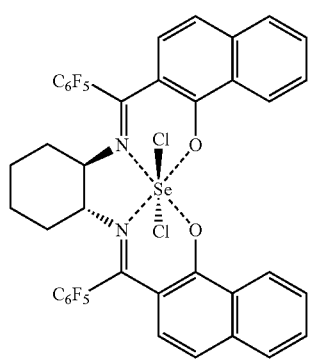
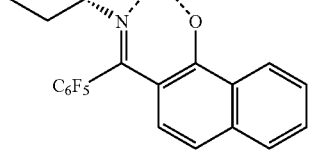
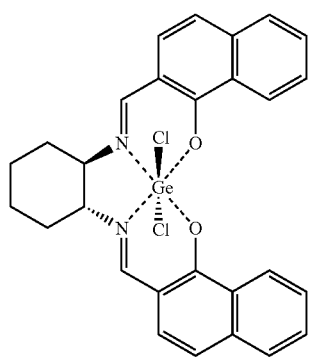
-continued
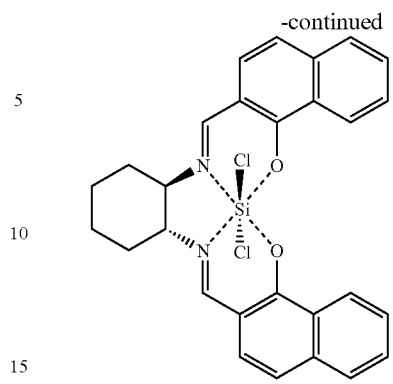
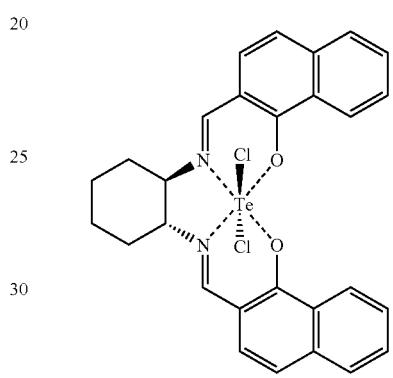
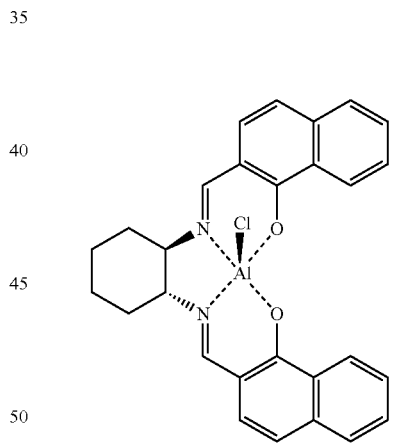
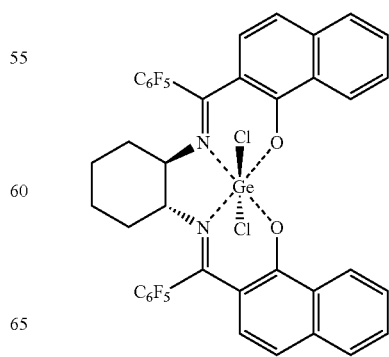

-continued
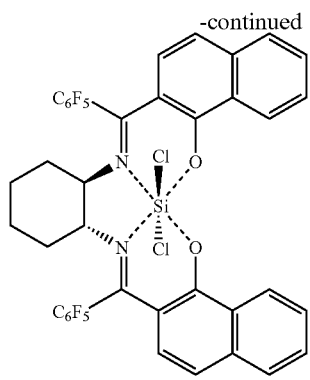
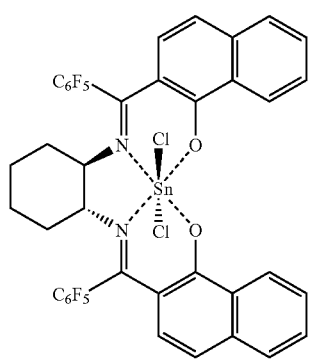
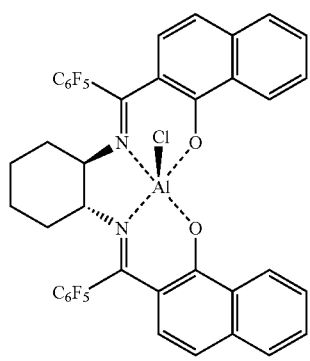
-continued
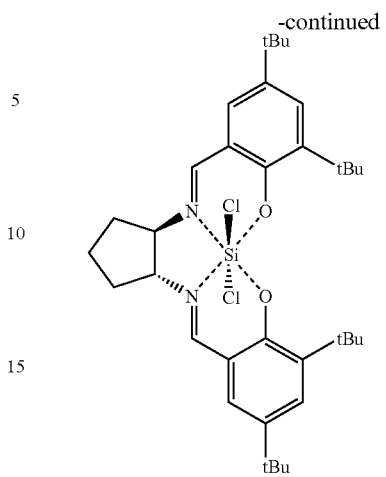
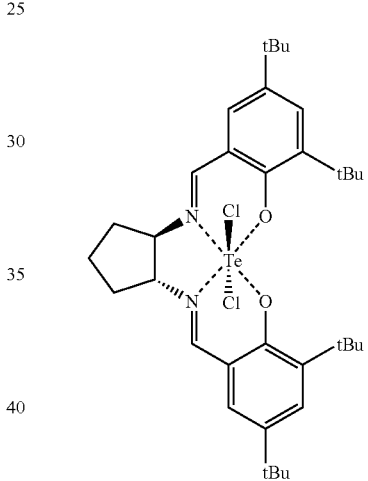
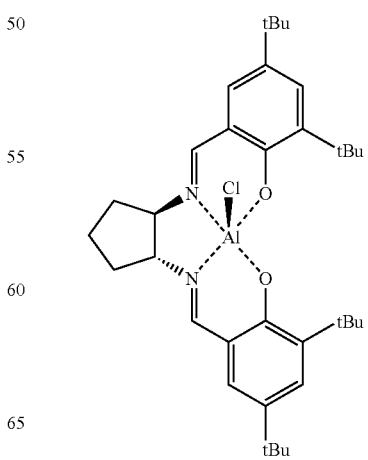
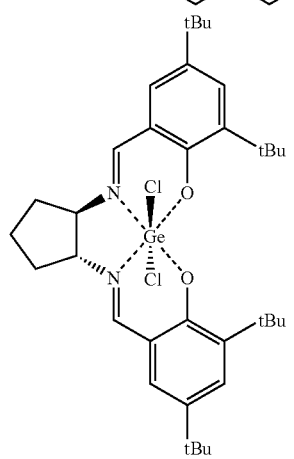

-continued
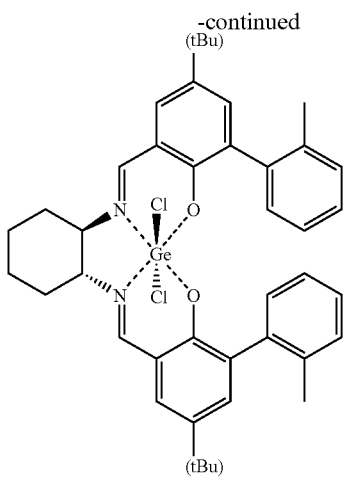
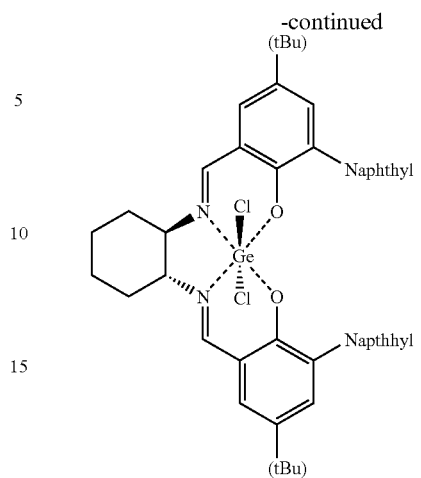
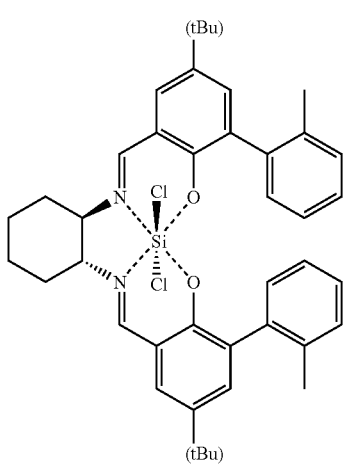
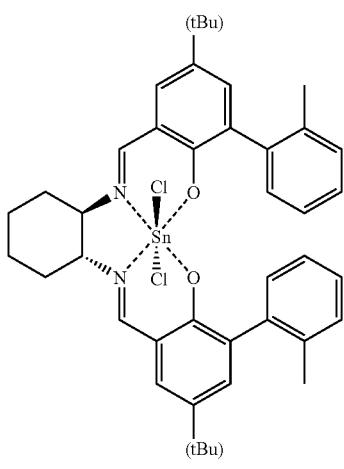

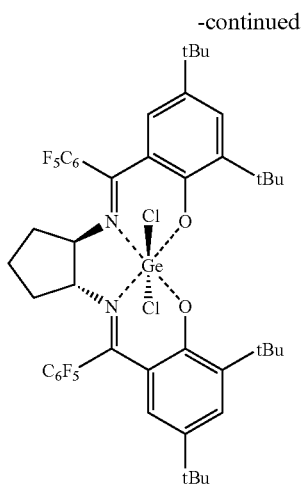
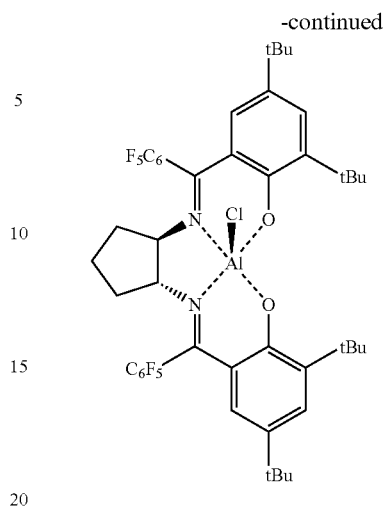
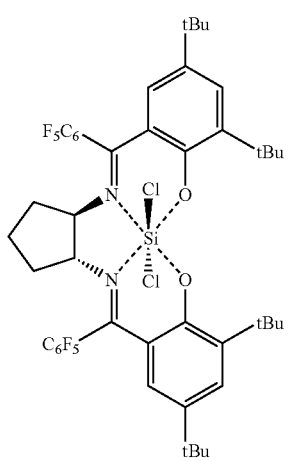
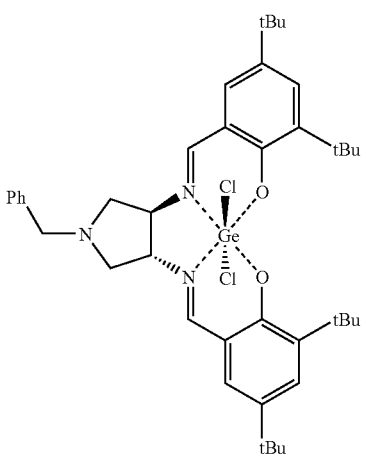
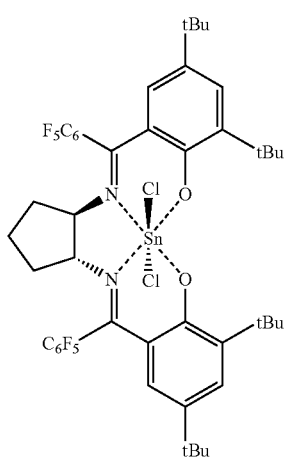
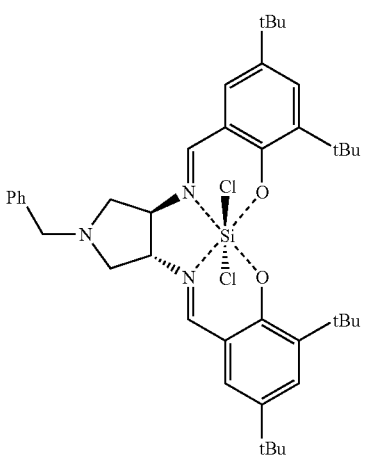

-continued
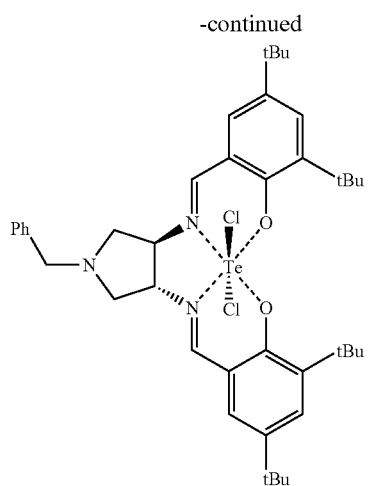
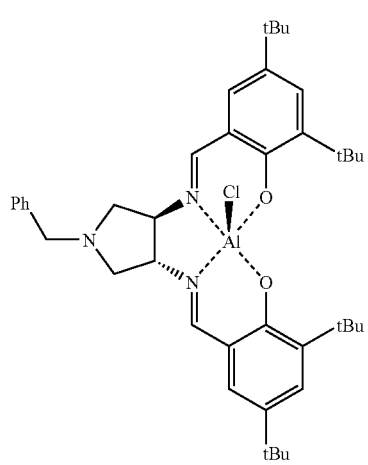
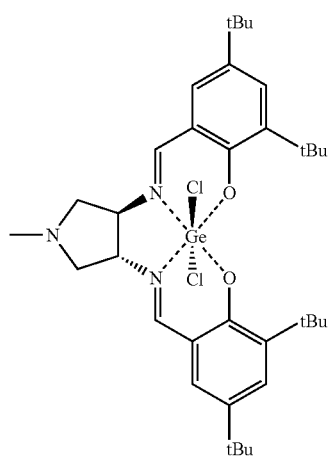
-continued
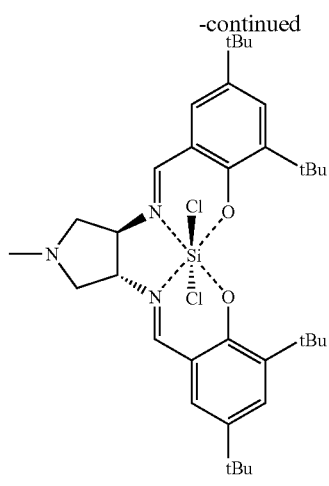
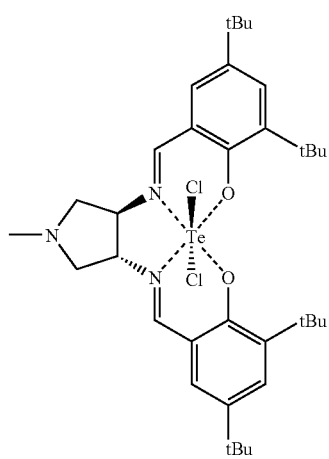
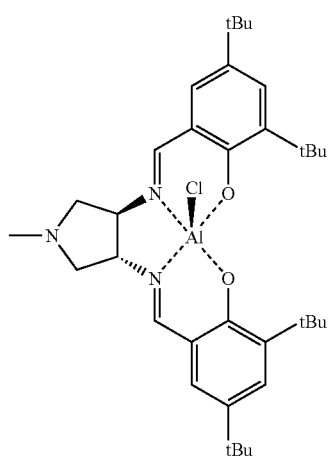

-continued
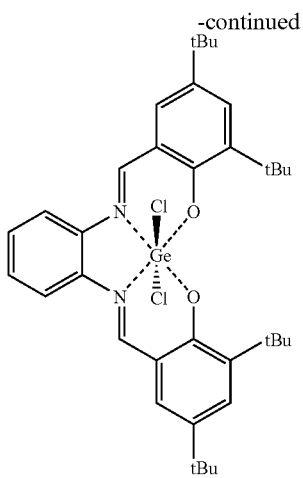
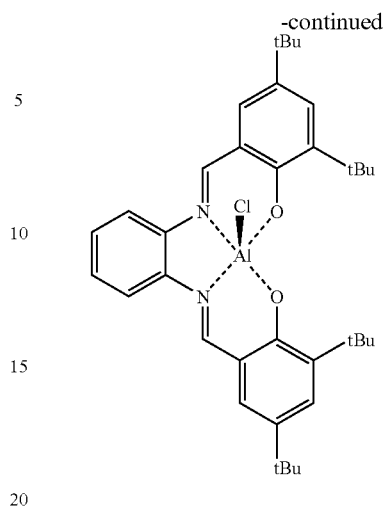
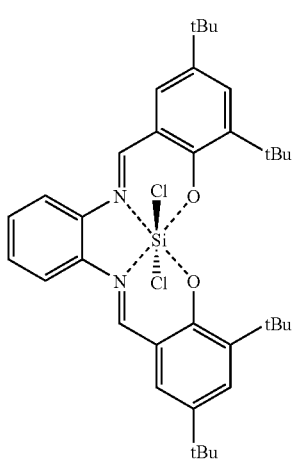
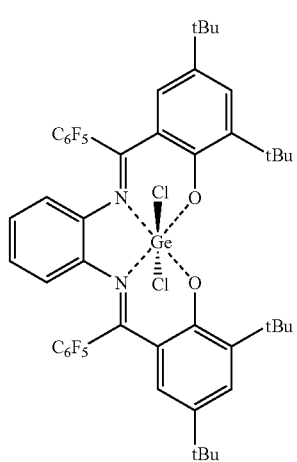
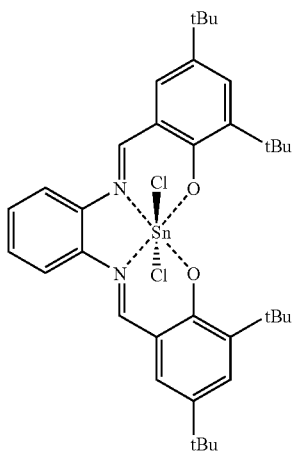
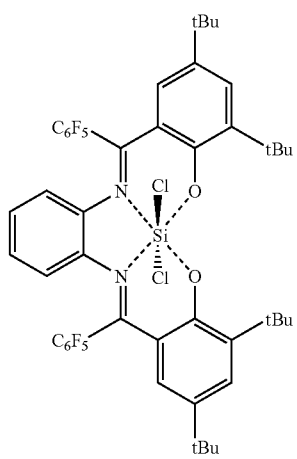

-continued
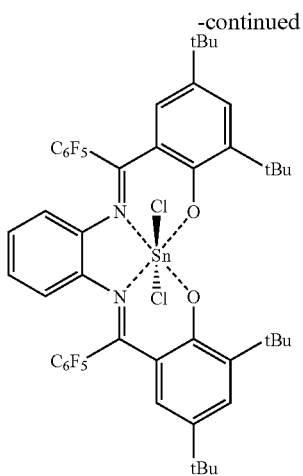
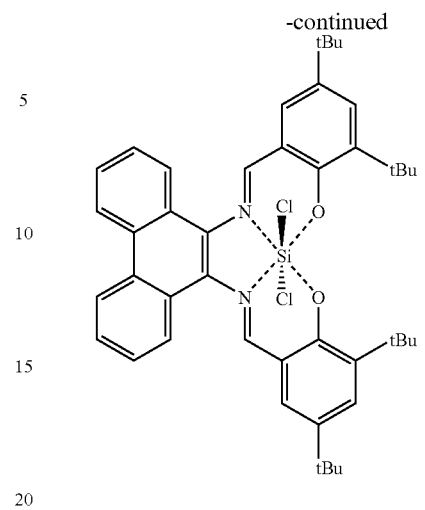
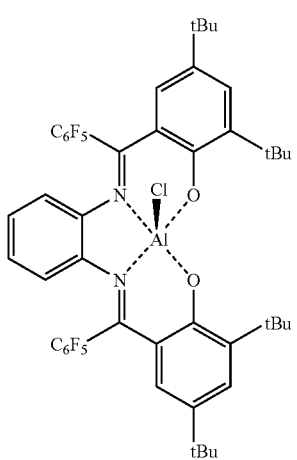
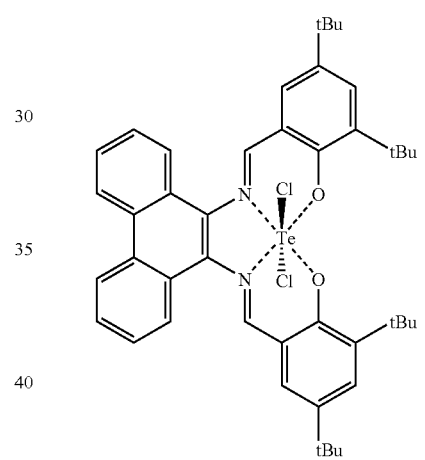
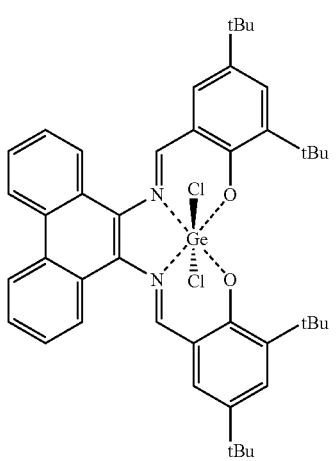
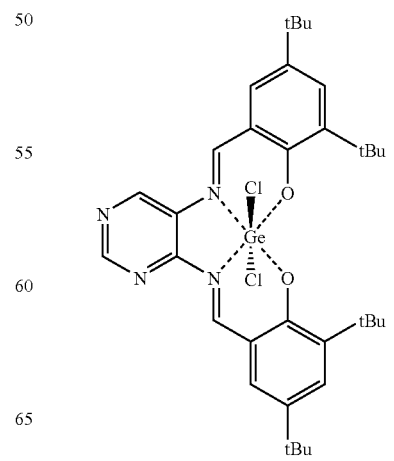

-continued
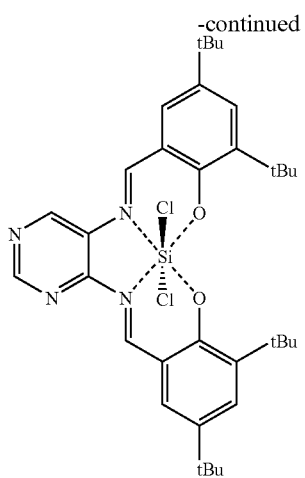
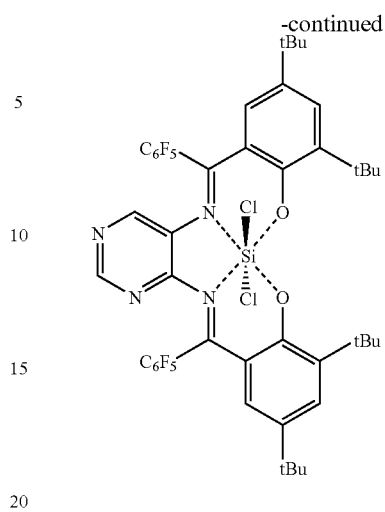
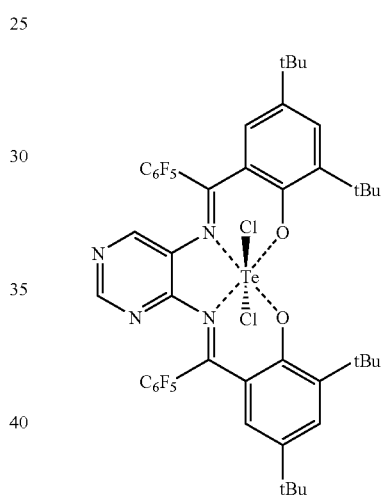
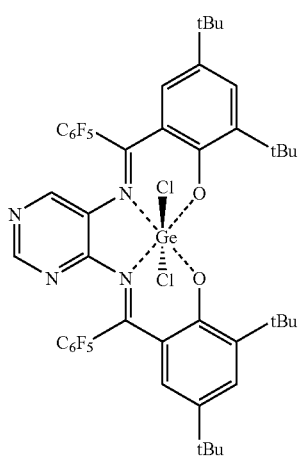
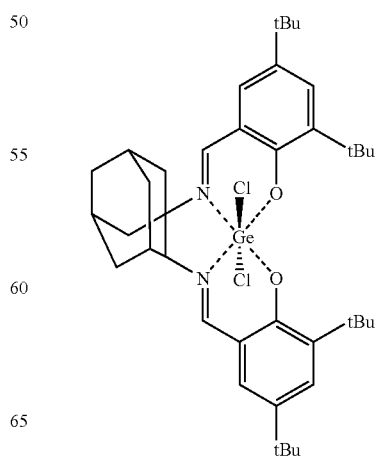

-continued
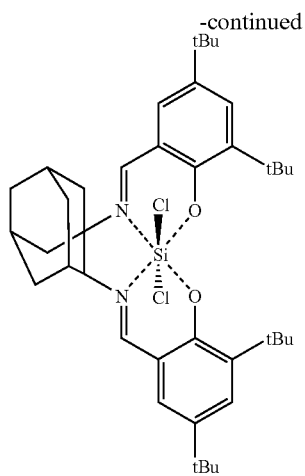
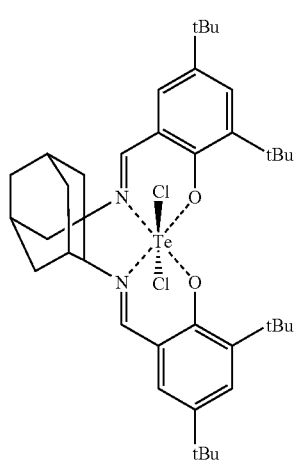
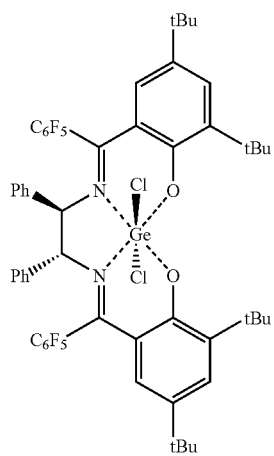
-continued
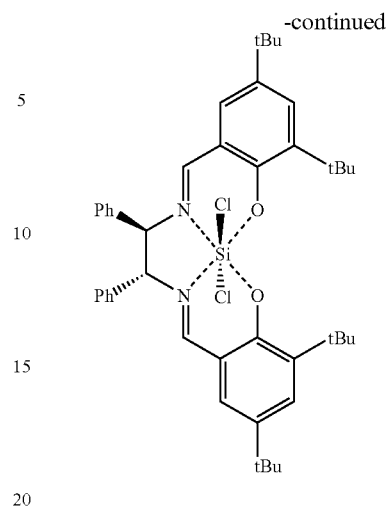
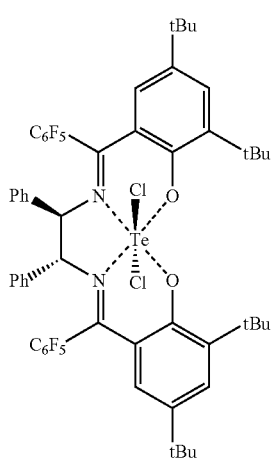
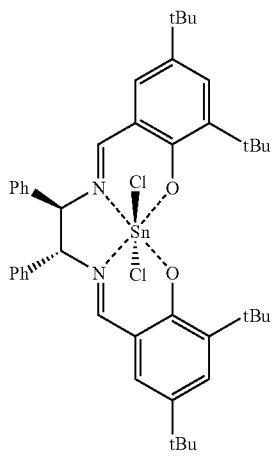

-continued

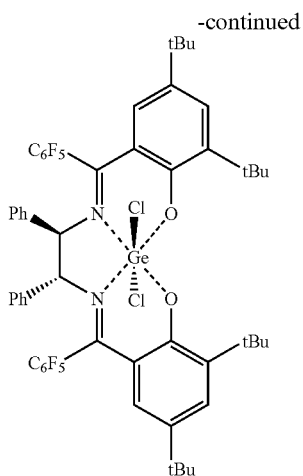

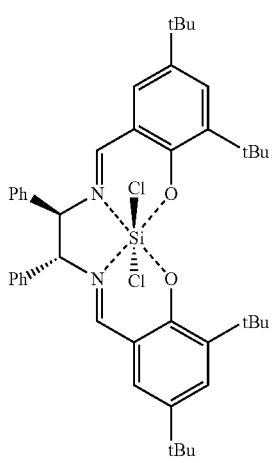

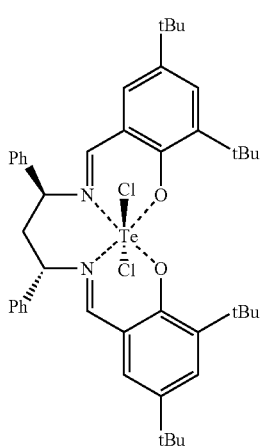

-continued

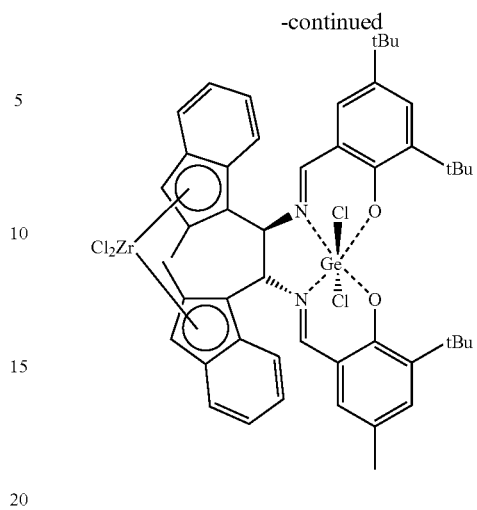

The preparation of the bridged chelating ligands and the coordination compounds prepared therefrom is known in principle from the literature and is described, for example, in WO 99/56699.

The cocatalyst which together with the chiral coordination compound of a main group element as central atom described in more detail above forms the polymerization-active catalyst system of the invention is able to convert the chiral coordination compound of a main group element into a cationic compound. This reaction step can include even replacement of the central atom.

Suitable cation-forming compounds are, for example, compounds such as an aluminoxane, a strong uncharged Lewis acid, an ionic compound having a Lewis acid cation or an ionic compound containing a Brönsted acid as cation. Preference is given to an aluminoxane, in particular methylaluminoxane, as cocatalyst.

As aluminoxanes, it is possible to use, for example, the compounds described in WO 00/31090. Particularly useful aluminoxanes are open-chain or cyclic aluminoxane compounds of the general formula (II) or (III)

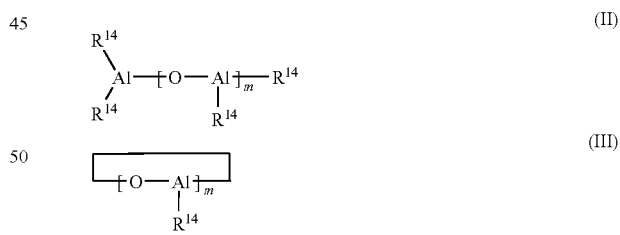

where $R^{14}$ is a $C_1$-$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear or cyclic chain molecules of various lengths, so that m is to be regarded as a mean. The aluminoxane compounds can also be present in a mixture with other metal alkyls, preferably aluminum alkyls.

Furthermore, modified aluminoxanes in which some of the hydrocarbon radicals or hydrogen atoms have been replaced by alkoxy, aryloxy, siloxy or amide radicals can also be used in place of the aluminoxane compounds of the general formula (II) or (III).

It has been found to be advantageous to use the chiral coordination compound of a main group element and the aluminoxane compounds in such amounts that the atomic ratio of aluminum from the aluminoxane compound to the central atom of the coordination compound is in the range from 10:1 to 1000:1, preferably in the range from 20:1 to 500:1 and in particular in the range from 30:1 to 400:1.

As strong, uncharged Lewis acids, preference is given to compounds of the general formula (IV)

$$M^2X^1X^2X^3 \qquad (IV)$$

where $M^2$ is an element of group 13 of the Periodic Table of the Elements, in particular B, Al or Ga, preferably B, $X^1$, $X^2$ and $X^3$ are each, independently of one another, hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryl, preferably pentafluorophenyl.

Further examples of strong, uncharged Lewis acids are given in WO 00/31090.

Particular preference is given to compounds of the general formula (IV) in which $X^1$, $X^2$ and $X^3$ are identical, preferably tris(pentafluorophenyl)borane.

Strong uncharged Lewis acids suitable as cation-forming compounds also include the reaction products from the reaction of a boronic acid with two equivalents of a trialkylaluminum or the reaction products from the reaction of a trialkylaluminum with two equivalents of an acidic fluorinated, in particular perfluorinated, hydrocarbon compound such as pentafluorophenol or bis(pentafluorophenyl)borinic acid.

Suitable ionic compounds having Lewis-acid cations include salt-like compounds of the cation of the general formula (V)

$$[(Y^{a+})Q_1Q_2 \ldots Q_z]^{d+} \qquad (V)$$

where

Y is an element of groups 1 to 16 of the Periodic Table of the Elements, $Q_1$ to $Q_z$ are singly negatively charged radicals such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, and d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinated counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound, e.g. triphenylchloromethane, with the boron or aluminium compound. In addition, a fourth compound which likewise reacts with the boron or aluminum compound, e.g. pentafluorophenol, can be added.

Ionic compounds containing Brönsted acids and cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Preferred ionic compounds as cation-forming compounds are, in particular, N,N-dimethylanilinium tetrakis(pentafluorophenyl)borate, N,N-dimethylcyclohexylammonium tetrakis(pentafluorophenyl)borate or N,N-dimethylbenzylammonium tetrakis(pentafluorophenyl)borate.

It is also possible for two or more borate anions to be joined to one another, as in the dianion $[(C_6F_5)_2B-C_6F_4-B(C_6F_5)_2]^{2-}$, or the borate anion can be bound via a bridge having a suitable functional group to the surface of a support particle.

Further suitable cation-forming compounds are listed in WO 00/31090.

The amount of strong, uncharged Lewis acids, ionic compounds having Lewis-acid cations or ionic compounds containing Brönsted acids as cations is usually from 0.1 to 20 equivalents, preferably from 1 to 10 equivalents, based on the chiral coordination compound of a main group element.

Suitable cation-forming compounds also include boron-aluminum compounds such as di[bis(pentafluorophenylboroxy)]methylalane. Examples of such boron-aluminum compounds are disclosed, for example, in WO 99/06414.

It is also possible to use mixtures of all the abovementioned cation-forming compounds. Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane.

Both the coordination compound of a main group element and the cation-forming compounds are preferably used in a solvent, preferably an aromatic hydrocarbon having from 6 to 20 carbon atoms, in particular xylenes and toluene.

The catalyst system of the invention can further comprise a metal compound of the general formula (VI), $$M^3(R^{15})_r(R^{16})_s(R^{17})_t \qquad (VI)$$

where $M^3$ is an alkali metal, an alkaline earth metal or a metal of group 13 of the Periodic Table of the Elements, i.e. boron, aluminum, gallium, indium or thallium, $R^{15}$ is hydrogen, $C_1$-$C_{10}$-alkyl, $C_6$-$C_{15}$-aryl, alkylaryl or arylalkyl each having from 1 to 10 carbon atoms in the alkyl radical and from 6 to 20 carbon atoms in the aryl radical, $R^{16}$ and $R^{17}$ are identical or different and are each hydrogen, halogen, $C_1$-$C_{10}$-alkyl, $C_6$-$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3, and s and t are integers from 0 to 2, with the sum r+s+t corresponding to the valence of $M^3$, where the metal compound of the formula (VI) is usually not identical to the cation-forming compound. It is also possible to use mixtures of various metal compounds of the formula (VI).

Among the metal compounds of the general formula (VI), preference is given to those in which
$M^3$ is lithium, magnesium or aluminum and
$R^{16}$ and $R^{17}$ are each $C_1$-$C_{10}$-alkyl.

Particularly preferred metal compounds of the formula (VI) are n-butyllithium, n-butyl-n-octylmagnesium, n-butyl-n-heptylmagnesium, tri-n-hexylaluminum, triisobutylaluminum, triethylaluminum and trimethylaluminum and mixtures thereof.

When a metal compound of the formula (VI) is used, it is preferably present in the catalyst system of the invention in such an amount that the molar ratio of $M^3$ from formula (VI) to the central atom of the chiral coordination compound of a main group element is from 800:1 to 1:1, in particular from 200:1 to 2:1.

The catalyst system of the invention particularly preferably further comprises a support.

To obtain such a supported catalyst system, the unsupported catalyst system can be reacted with a support. The order in which the support, the chiral coordination compound of a main group element and the cocatalyst are combined is in principle immaterial. The chiral coordination compound of a main group element and the cocatalyst can be fixed to the support independently of one another or simultaneously. After the individual process steps, the solid can be washed with suitable inert solvents such as aliphatic or aromatic hydrocarbons.

As supports, preference is given to using finely divided supports which can be any organic or inorganic, inert solid. In particular, the support can be a porous solid such as talc, a sheet silicate, an inorganic oxide or a finely divided polymer powder (e.g. polyolefin).

Suitable inorganic oxides may be found in groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, $ZrO_2$, $TiO_2$ or $B_2O_3$. A preferred mixed oxide is, for example, calcined hydrotalcite.

The support materials used preferably have a specific surface area in the range from 10 to 1000 m²/g, a pore volume in the range from 0.1 to 5 ml/g and a mean particle size of from 1 to 500 μm. Preference is given to supports having a specific surface area in the range from 50 to 500 m²/g, a pore volume in the range from 0.5 to 3.5 ml/g and a mean particle size in the range from 5 to 350 μm. Particular preference is given to supports having a specific surface area in the range from 200 to 400 m²/g, a pore volume in the range from 0.8 to 3.0 ml/g and a mean particle size of from 10 to 100 μm.

The inorganic support can be subjected to a thermal treatment, e.g. to remove adsorbed water. Such a drying treatment is generally carried out at temperatures in the range from 80 to 300° C., preferably from 100 to 200° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gel with silane containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and should preferably likewise be freed of adhering moisture, solvent residues or other impurities by means of appropriate purification and drying operations before use. It is also possible to use functionalized polymer supports, e.g. ones based on polystyrenes, via whose functional groups, for example ammonium or hydroxy groups, at least one of the catalyst components can be fixed.

In a preferred embodiment of the preparation of the supported catalyst system of the invention, at least one chiral coordination compound of a main group element is brought into contact with at least one cocatalyst as cation-forming compound in a suitable solvent, preferably giving a soluble reaction product, an adduct or a mixture.

The preparation obtained in this way is then brought into contact with the dehydrated or passivated support material, the solvent is removed and the resulting supported catalyst system is dried to ensure that all or most of the solvent is removed from the pores of the support material. The supported catalyst is obtained as a free-flowing powder. Examples of the industrial implementation of the above process are described in WO 96/00243, WO 98/40419 or WO 00/05277.

A further preferred embodiment comprises firstly applying the cation-forming compound to the support component and subsequently bringing this supported cation-forming compound into contact with the chiral coordination compound of a main group element.

Combinations obtained by combining the following components are therefore likewise of importance as cocatalyst systems:

1st component: at least one defined boron or aluminum compound,

2nd component: at least one uncharged compound having at least one acidic hydrogen atom, 3rd component: at least one support, preferably an inorganic oxidic support, and optionally as 4th component a base, preferably an organic nitrogen-containing base such as an amine, an aniline derivative or a nitrogen heterocycle.

The boron or aluminum compounds used in the preparation of these supported cocatalysts are preferably ones of the formula (VII)

(VII)

where
the radicals $R^{18}$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl, or $R^{18}$ is an $OSiR^{19}_3$— group, where the radicals $R^{19}$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl, $C_7$-$C_{40}$-haloalkylaryl, preferably hydrogen, $C_1$-$C_8$-alkyl or $C_7$-$C_{20}$-arylalkyl, and $M^4$ is boron or aluminum, preferably aluminum.

Particularly preferred compounds of the formula (VII) are trimethylaluminum, triethylaluminum and triisobutylaluminum.

The uncharged compounds which have at least one acidic hydrogen atom and can react with compounds of the formula (VII) are preferably compounds of the formulae (VIII), (IX) or (X), $$R^{20}\text{-D-H} \quad\quad\quad (VIII)$$

$$(R^{20})_{3-h}\text{—B-(D-H)}_h \quad\quad\quad (IX)$$

$$\text{H-D-}R^{21}\text{D-H} \quad\quad\quad (X)$$

where the radicals $R^{20}$ are identical or different and are each hydrogen, halogen, a boron-free $C_1$-$C_{40}$ group such as $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl, $C_7$-$C_{40}$-haloalkylaryl, an $Si(R^{22})_3$ group or a $CH(SiR^{22}{}_3)_2$ group, where $R^{22}$ is a boron-free $C_1$-$C_{40}$ group such as $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl, $C_7$-$C_{40}$-haloalkylaryl, and $R^{21}$ is a divalent $C_1$-$C_{40}$ group such as $C_1$-$C_{20}$-alkylene, $C_1$-$C_{20}$-haloalkylene, $C_6$-$C_{20}$-arylene, $C_6$-$C_{20}$-haloarylene, $C_7$-$C_{40}$-arylalkylene, $C_7$-$C_{40}$-haloarylalkylene, $C_7$-$C_{40}$-alkylarylene, $C_7$-$C_{40}$-haloalkylarylene, D is an element of group 16 of the Periodic Table of the Elements or an $NR^{23}$ group, where $R^{23}$ is hydrogen or a $C_1$-$C_{20}$-hydrocarbon radical such as $C_1$-$C_{20}$-alkyl or $C_6$-$C_{20}$-aryl, preferably oxygen, and h is 1 or 2.

Suitable compounds of the formula (VIII) include waster, alcohols, phenol derivatives, thiophenol derivatives or aniline derivatives, with halogenated and in particular perfluorinated alcohols and phenols being of particular importance. Examples of particularly useful compounds are pentafluorophenol, 1,1-bis(pentafluorophenyl)methanol and 4-hydroxy-2,2',3,3',4',5,5',6,6'-nonafluorobiphenyl.

Suitable compounds of the formula (IX) include boronic acids and borinic acids, in particular borinic acids having perfluorinated aryl radicals, for example $(C_6F_5)_2BOH$.

Suitable compounds of the formula (X) include dihydroxy compounds in which the divalent carbon-containing group is preferably halogenated and in particular perfluorinated. An example of such a compound is 4,4'-dihydroxy-2,2',3,3',5,5',6,6'-octafluorobiphenyl hydrate.

Examples of combinations of compounds of the formula (VII) with compounds of the formula (VIII) or (X) are trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol or triisobutylaluminum/pentafluorophenol or triethylaluminum/4,4'-dihydroxy-2,2',3,3',5,5',6,6'-octafluorobiphenyl hydrate, with, for example, reaction products of the following type being able to be formed.

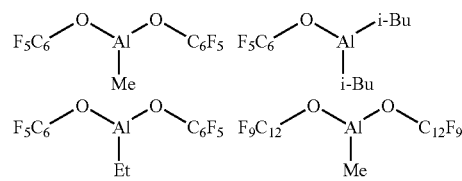

Examples of reaction products from the reaction of at least one compound of the formula (VII) with at least one compound of the formula (IX) are:

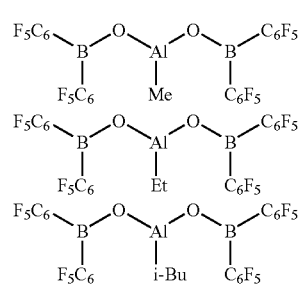

The components can in principle be combined in any desired way.

If appropriate, the reaction products from the reaction of at least one compound of the formula (VII) with at least one compound of the formula (VIII), (IX) or (X) and optionally the organic nitrogen base are additionally combined with an organometallic compound of the formula (II), (III), (IV) and/or (VI), in order then to form the supported cocatalyst system with the support.

In a preferred variant, the 1st component, e.g. compounds of the formula (VII), is combined with the 2nd component, e.g. compounds of the formula (VIII), (IX) or (X), and a support as 3rd component is combined separately with a base as 4th component and the mixtures are subsequently reacted with one another, preferably in an inert solvent or suspension medium. The supported cocatalyst formed can be freed of the inert solvent or suspension medium before it is reacted with the chiral coordination compound a main group element and, if appropriate, a metal compound of the formula (VI) to form the catalyst system of the invention.

It is also possible for the catalyst solid of the invention firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system of the invention. The molar ratio of additives to chiral coordination compound of a main group element is usually from 1:1000 to 1000:1, preferably from 1:5 to 20:1.

The novel catalyst systems based on the chiral coordination compounds of a main group element which have been described in more detail above give, in comparison with the previously known catalyst systems which are free of transition metals, isotactic polyolefins, in particular isotactic polypropylene, having a high melting point.

The invention further provides, firstly, for the use of a novel catalyst system as described above for preparing polyolefins and, secondly, provides processes for preparing polyolefins by polymerization or copolymerization of at least one olefin in the presence of a novel catalyst system as described above.

In general, the catalyst system of the invention is used together with a further metal compound of the general formula (VI) which may be different from the metal compound or compounds of the formula (VI) used in the preparation of the catalyst system of the invention for the polymerization or copolymerization of olefins. The further metal compound is generally added to the monomer or the suspension medium and serves to free the monomer of substances which can adversely affect the catalyst activity. It is also possible to add one or more further cation-forming compounds to the catalyst system of the invention in the polymerization process.

The olefins can be functionalized, olefinically unsaturated compounds such as esters or amide derivatives of acrylic or methacrylic acid, for example acrylates, methacrylates or acrylonitrile, or nonpolar olefinic compounds included aryl-substituted α-olefins.

Preference is given to polymerizing olefins of the formula $R'''—CH=CH—R''$, where $R'''$ and $R''$ are identical or different and are each hydrogen or a radical containing from 1 to 20 carbon atoms, in particular from 1 to 10 carbon atoms, or $R'''$ and $R''$ together with the atoms connecting them form one or more rings.

Examples of such olefins are 1-olefins having from 2 to 40, preferably from 2 to 10, carbon atoms, e.g. ethylene, propylene, 1-butene, 1-pentene, 1-hexene, 1-heptene, 1-octene, 1-decene or 4-methyl-1-pentene or unsubstituted or substituted vinylaromatic compounds such as styrene and styrene derivatives, or dienes such as 1,3-butadiene, 1,4-hexadiene, 1,7-octadiene, 5-ethylidene-2-norbornene, norbornadiene, ethylnorbornadiene or cyclic olefins such as norbornene, tetracyclododecene or methylnorbornene. Preference is given to ethylene, propylene, 1-butene, 1-hexene or 4-methyl-1-pentene.

The catalyst system of the invention is particularly preferably used for homopolymerizing propylene or ethylene, in particular propylene, or copolymerizing ethylene with $C_3$-$C_8$-α-olefins such as propylene, 1-butene, 1-pentene, 1-hexene and/or 1-octene and/or cyclic olefins such as norbornene and/or dienes having from 4 to 20 carbon atoms, e.g. 1,4-hexadiene, norbornadiene, ethylidenenorbornene or ethylnorbornadiene, or particularly preferably for copolymerizing propylene with ethylene and/or 1-butene. Examples of such copolymers are propylene/ethylene, propylene/1-butene, ethylene/1-butene, ethylene/1-hexene, ethylene/1-octene copolymers, ethylene/propylene/ethylidenenorbornene or ethylene/propylene/1,4-hexadiene terpolymers.

The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes and gas-phase fluidized-bed processes are all possible. As solvent or suspension medium, it is possible to use inert hydrocarbons, for example isobutane, or else the monomers themselves.

The polymerization can be carried out at temperatures in the range from −60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. As molar mass regulator and/or to increase the activity, hydrogen can be used in the polymerization. Furthermore, it is possible to use customary additives such as antistatics. To carry out the polymerization, the catalyst system of the invention can be used directly, i.e. it is introduced in pure form into the polymerization system, or it is admixed with inert components such as paraffins, oils or waxes in order to improve meterability.

The catalyst systems of the invention are very useful for preparing propylene homopolymers having high melting points.

The invention further provides for the use of a chiral coordination compound of a main group element of the formula (Ib) or an enantiomer thereof of the formula (Ib*) for preparing a catalyst system for the polymerization of olefins,

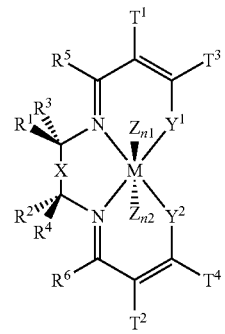

(Ib)

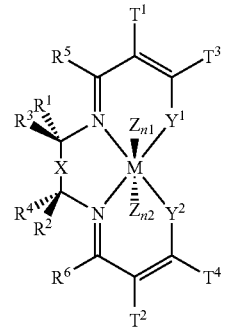

(Ib*)

where the variables are as defined for the formulae (I) and (I*).

Particular preference is given to preparing a catalyst system using the chiral coordination compounds of a main group element of the formula (Ic) or (Ic*)

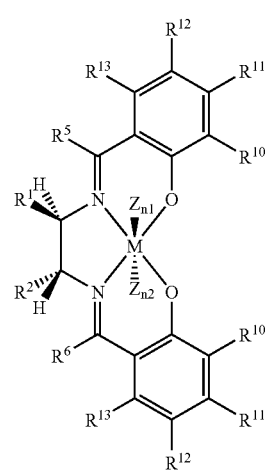

(Ic)

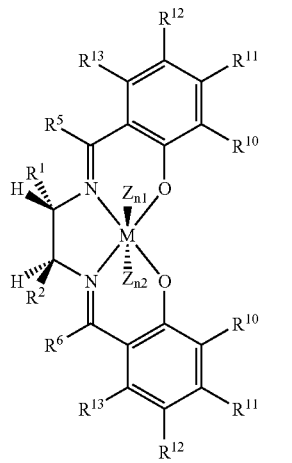

(Ic*)

where the variables are as defined for the formulae (Ia) and (Ia*).

The invention further provides chiral coordination compounds of a main group element of the formula (Ib) or (Ib*) in which M is Si, Ga, Ge, As, In, Sn, Sb or Te, in particular Si or Ge.

The invention further provides a process for preparing a catalyst system for olefin polymerization, which comprises reacting at least one coordination compound of a main group element of the formula (Ib) or (Ib*) with at least one cation-forming compound and a process for preparing isotactic polyolefins by polymerizing at least one α-olefin in the presence of a catalyst system prepared by the process just mentioned.

The invention further provides the polyolefins obtainable by one of the abovementioned polymerization processes, in particular homopolymers and copolymers of propylene, and also polyolefin compositions comprising the polyolefins obtainable using the catalyst systems of the invention.

The isotactic polypropylenes which can be prepared by the process of the invention have a viscosity number (I.V.) of greater than 1, a melting point ($T_m$) of greater than 158° C., preferably greater than 160° C., in particular greater than 163° C., an isotacticity determined by pentad analysis of the $^{13}$C-NMR of polymer samples of greater than 98%, in particular greater than 99%, a proportion of reverse insertions determined by pentad analysis of the $^{13}$C-NMR of polymer samples of less than 0.3%, in particular less than 0.25%, and a polydispersity Q=Mw/Mn of less than 3, in particular less than 2.5.

The polymers prepared by the process of the invention and polyolefin compositions in which these are present are particularly useful for producing films, fibers and moldings.

The invention further provides films, fibers and moldings produced from the above-described polyolefin compositions.

The invention is illustrated by the following examples which do not, however, restrict the scope of the invention.

EXAMPLES

General Procedures

Synthesis and handling of organometallic compounds and the catalysts was carried out in the absence of air and moisture under argon (glove box and Schlenk technique). All solvents used were purged with argon and dried over molecular sieves before use. (S,S)-(+)N,N'-bis(3,5-di-tert-butylsalicylidene)-1,2-diaminocyclohexane, (R,R)-(−)N,N'-bis(3,5-di-tert-butylsalicylidene)-1,2-diaminocyclohexane and (S,S)-(+)N,N'-bis(3,5-di-tert-butylsalicylidene)-1,2-diaminocyclohexanealuminum(III) chloride were commercially available.

Determination of the Melting Point:

The melting point $T_m$ was determined by DSC measurement in accordance with ISO standard 3146 in a first heating phase at a heating rate of 20° C. per minute up to 200° C., a dynamic crystallization at a cooling rate of 20° C. per minute down to 25° C. and a second heating phase at a heating rate of 20° C. per minute up to 200° C. again. The melting point was then the temperature at which the curve of enthalpy versus temperature measured in the second heating phase displayed a maximum.

Gel Permeation Chromatography:

Gel permeation chromatography (GPC) was carried out at 145° C. in 1,2,4-trichlorobenzene using a Waters 150 C GPC apparatus. Evaluation of the data was carried out using the software Win-GPC from HS-Entwicklungsgesellschaft für wissenschaftliche Hard-und Software mbH, Oberhilbersheim. Calibration of the columns was carried out using polypropylene standards having molar masses of from 100 to $10^7$ g/mol. Mass average ($M_w$) and number average ($M_n$) molar masses of the polymers were determined. The Q value is the ratio of weight average ($M_w$) to number average ($M_n$).

Determination of the Viscosity Number (I.V.):

The viscosity number was determined in decalin at 135° C. on an Ubbelohde viscometer PVS 1 with an S 5 measuring head (both from Lauda). To prepare the samples, 20 mg of polymer were dissolved in 20 ml of decalin at 135° C. over a period of 2 hours. 15 ml of the solution were introduced into the viscometer, and the instrument carried out a minimum of three running-out time measurements until a consistent result had been obtained. The I.V. was calculated from the running-out times in accordance with I.V.=$(t/t_0-1)*1/c$, where t: mean running-out time of the solution, $t_0$: mean of the running-out time of the solvent, c: concentration of the solution in g/ml.

Example 1

Synthesis of (S,S)-(+)-N,N'-bis(3,5-di-tert-butylsalicylidene)-1,2-diaminocyclohexanesilicon(IV) dichloride (1)

1.04 g (6 mmol) of silicon tetrachloride were added to a solution of 3 g (5.5 mmol) of (S,S)-(+)N,N'-bis(3,5-di-tert-butylsalicylidene)-1,2-diaminocyclohexane in 120 ml of diethyl ether at room temperature. The yellow suspension was stirred at room temperature for 18 hours and subsequently filtered. The yellow solid on the frit was repeatedly washed with diethyl ether and subsequently dried. The residue was suspended in dichloromethane, the suspension was filtered and the filtrate was collected. The filtrate was evaporated completely under reduced pressure. This gave 2 g of (1) as a yellow, free-flowing powder.

Example 2

Synthesis of (S,S)-(+)-N,N'-bis(3,5-di-tert-butylsalicylidene)-1,2-diaminocyclohexanegermanium(IV) dichloride (2)

1.2 g (5.5 mmol) of germanium tetrachloride were added to a solution of 3.0 g (5.38 mmol) of (S,S)-(+)N,N'-bis(3,5-ditert-butylsalicylidene)-1,2-diaminocyclohexane in 120 ml of n-pentane at room temperature. The yellow suspension was stirred at room temperature for 18 hours and subsequently filtered. The yellow solid on the frit was repeatedly washed with n-pentane and with diethyl ether and subsequently dried under reduced pressure. This gave 1.5 g of (2) as a brilliant yellow free-flowing powder. Crystals were obtained from a saturated solution of (2) in toluene. X-ray structure analysis: FIG. 1 shows the structure of the compound (2).

Example P1

Homopolymerization of propene 4 ml of a solution of triisobutylaluminum in hexane (4 mmol, 1M) were placed in a 1 l reactor. 250 g of propylene were introduced at 30° C., the contents of the reactor were heated to a temperature of 50° C. and 50 ml of hydrogen were subsequently added. A catalyst solution prepared by combining 0.7 mg of the silicon compound (1) (1.1 µmol) from Example 1 and 2.1 ml of a solution of methylaluminoxane in toluene (3.32 mmol, 10% by weight) and allowing an after-reaction to take place afterwards for 15 minutes was introduced into the reactor together with 50 g of propylene at 80° C. The contents of the reactor were stirred at 70° C. for 2 hours and the polymerization reactor was stopped by venting the reactor. 5 ml of methanol were added to the contents of the reactor. The polymer was dried overnight under reduced pressure. This gave 2.50 g of polypropylene. The results of the polymerization and the results of the polymer analysis are shown in Table 1 below.

Example P2

Homopolymerization of propene

The polymerization was carried out in a manner analogous to Example P1. 4 ml of a solution of triisobutylaluminum in hexane (4 mmol, 1M) together with 250 g of propylene were placed in the reactor at 30° C. and heated to 50° C. A catalyst solution prepared by combining 0.7 mg of the silicon compound (1) (1.1 µmol) from Example 1 and 2.1 ml of a solution of methylaluminoxane in toluene (3.32 mmol, 10% by weight) and allowing an after-reaction to take place afterwards for 15 minutes was introduced into the reactor together with 50 g of propylene at 80° C. The contents of the reactor were stirred at 70° C. for 2 hours. After the reaction had been stopped and the polymer had been worked up, 2.5 g of polypropylene were obtained. The results of the polymerization and the results of the polymer analysis are shown in Table 1 below.

Example P3

Homopolymerization of propene

The polymerization was carried out in a manner analogous to Example P1. 4 ml of a solution of triisobutylaluminum in hexane (4 mmol, 1M) and 1.9 ml of MAO (3.0 mmol, 10% by weight) together with 250 g of propylene were placed in the reactor at 30° C., 50 ml of hydrogen were added and the mixture heated to 50° C. A catalyst solution prepared by combining 0.7 mg of the germanium compound (2) (1.02 µmol) from Example 2 and 1.9 ml of a solution of methylaluminoxane in toluene (1.58 mmol, 10% by weight) and allowing an after-reaction to take place afterwards for 15 minutes was introduced into the reactor together with 50 g of propylene at 80° C. The reactor was heated to 70° C., and the contents of the reactor were stirred at 70° C. for 2 hours. After the reaction had been stopped and the polymer had been worked up, 24.4 g of polypropylene were obtained. The results of the polymerization and the results of the polymer analysis are shown in Table 1 below.

Example P4

Homopolymerization of propene

The polymerization was carried out in a manner analogous to Example P3. 4 ml of a solution of triisobutylaluminum in hexane (4 mmol, 1M) and 5 ml of MAO (7.9 mmol, 10% by weight) together with 250 g of propylene were placed in the reactor at 30 20 C., 50 ml of hydrogen were added and the mixture was heated to 50° C. A catalyst solution prepared by combining 0.7 mg (1.15 mmol) of (S,S)-(+)-N,N'-bis(3,5-di-tert-butylsalicylidene)-1,2-diaminocyclohexanealuminum (III) monochloride (3) (Aldrich) and 2.2 ml of a solution of methylaluminoxane in toluene (1.58 mmol, 10% by weight) and allowing an after-reaction to take place afterwards for 15 minutes was introduced into the reactor together with 50 g of propylene at 80° C. The contents of the reactor were stirred at 70° C. for 2 hours. After the reaction had been stopped and the polymer had been worked up, 10.8 g of polypropylene were obtained. The results of the polymerization and the results of the polymer analysis are shown in Table 1 below.

TABLE 1

| Example | M | Al/M [mol/mol] | Activity [kg/(g * h)] | Melting point [° C.] | Viscosity number [dl/g] | $M_w$ [kg/mol] | Q |
|---|---|---|---|---|---|---|---|
| P1 | Si | 3050 | 3.1 | 168.6 | 1.3 | 166 | 1.96 |
| P2 | Si | 3050 | 0.9 | 164.9 | 1.8 | 328 | 2.36 |
| P3 | Ge | 2950 | 17.4 | 163.2 | 2.6 | 354 | 2.7 |
| P4 | Al | 3019 | 7.7 | 164.7 | 2.1 | 288 | 2.85 |

Units and abbreviations: Al/M is the molar ratio of aluminum from the MAO to the amount of the coordination compound; activity in $kg_{polymer}/(g_{coordination\ compound}*h_{polymerization\ time})$; weight average molar mass determined by GPC; polydispersity $Q=M_n/M_w$

The invention claimed is:

1. A catalyst system for preparing isotactic polyolefins are obtained by reacting at least one chiral coordination compound and at least one cocatalyst, the cocatalyst being able to convert the chiral coordination compound into a species comprising polymerization activity towards at least one olefin, wherein the chiral coordination compound is of formula (I), or an enantiomer thereof of formula (I*):

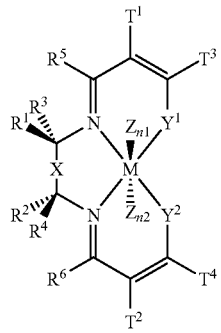
(I)

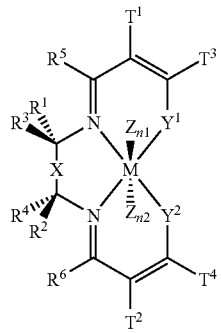
(I*)

wherein

M is Si or Ge;

Z are identical or different, and are each an organic or inorganic radical;

n1, n2 are identical or different, and are each 0 or 1;

$R^1$ and $R^2$ are identical or different, and are each a $C_1$-$C_{40}$ radical, or $R^1$ and $R^2$ together with the atoms connecting them form a cyclic or polycyclic ring system optionally comprising at least one, identical or different, heteroatom selected from the group consisting of N, O, P, S and Si;

$R^3$ is hydrogen or a $C_1$-$C_{40}$ radical, wherein $R^3$ displays a lower steric hindrance than $R^1$;

$R^4$ is hydrogen or a $C_1$-$C_{40}$ radical, wherein $R^4$ displays a lower steric hindrance than $R^2$;

$R^5$ and $R^6$ are identical or different, and are each hydrogen or a $C_1$-$C_{40}$ radical; or $R^1$ and $R^3$, $R^2$ and $R^4$, $R^1$ and $R^5$ and/or $R^2$ and $R^6$ together with the atoms connecting them in each case form a cyclic or polycyclic ring system optionally comprising at least one, identical or different heteroatom selected from the group consisting of N, 0, P, S and Si;

X is a single bond or a divalent group;

$Y^1$, $Y^2$ are identical or different, and are each oxygen, sulfur, selenium, tellurium, $NR^9$, or $PR^9$;

$R^7$, $R^8$, $R^9$ are identical or different, and are each hydrogen, a $C_1$-$C_{20}$-alkyl, a $C_2$-$C_{20}$-alkenyl, a $C_6$-$C_{22}$-aryl, or an alkylaryl or arylalkyl comprising from 1 to 10 carbon atoms in the alkyl radical and from 6 to 22 carbon atoms in the aryl radical; and $T^1$, $T^2$, $T^3$ and $T^4$ are identical or different, and are each hydrogen or a $C_1$-$C_{40}$ radical, or $T^1$ and $T^3$ and/or $T^2$ and $T^4$ together with the carbon atoms connecting them in each case form a cyclic or polycyclic ring system optionally comprising at least one, identical or different heteroatom selected from the group consisting of N, O, P, S and Si.

2. The catalyst system according to claim 1, wherein the chiral coordination compound is of formula (Ia), or an enantiomer thereof of the formula (Ia*):

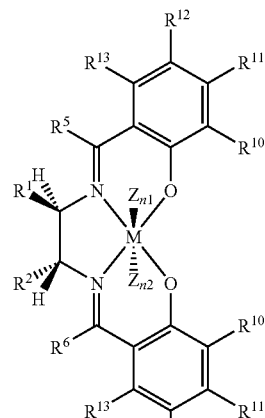
(Ia)

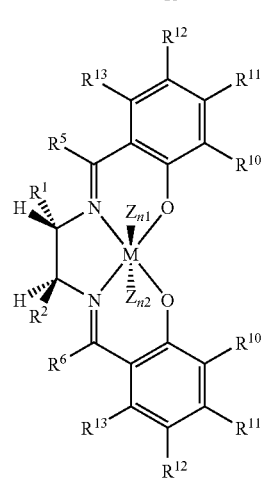
(Ia*)

where

M is Si or Ge;

Z are identical or different, and are each halogen, hydrogen, $C_1$-$C_{10}$-alkyl, $C_6$-$C_{14}$-aryl, alkylaryl or arylalkyl comprising from 1 to 4 carbon atoms in the alkyl radical and from 6 to 10 carbon atoms in the aryl radical;

n1, n2 are identical or different, and are each 0 or 1;

$R^1$ and $R^2$ are identical or different, and are each a $C_1$-$C_{40}$ radical, or $R^1$ and $R^2$ together with the atoms connecting them form a cyclic or polycyclic ring system optionally comprising at least one, identical or different, heteroatom selected from the group consisting of N, O, P, S and Si;

$R^5$ and $R^6$ are identical or different, and are each hydrogen or a $C_1$-$C_{40}$ radical; and $R^{10}$, $R^{11}$, $R^{12}$ and $R^{13}$ are identical or different and are each hydrogen, halogen or a $C_1$-$C_{40}$ radical, or optionally two adjacent $R^{10}$, $R^{11}$, $R^{12}$ and $R^{13}$ together with the two carbon atoms connecting them form a cyclic ring system.

3. The catalyst system according to claim 1, wherein the cocatalyst is an aluminoxane.

4. The catalyst system according to claim 1 further comprising a support.

5. A process for preparing polyolefins by polymerization or copolymerization of at least one olefin in the presence of a catalyst system according to claim 1.

6. A process for preparing a catalyst system for olefin polymerization, the process comprising reacting at least one cocatalyst with at least one chiral coordination compound of formula (I), or an enantiomer thereof of formula (I*):

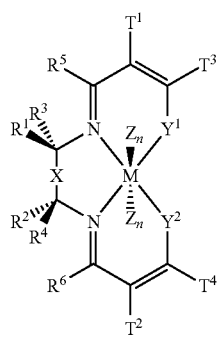

(I)

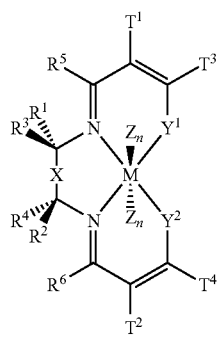

(I*)

wherein

M is Si or Ge;

Z are identical or different, and are each an organic or inorganic radical;

n1, n2 are identical or different, and are each 0 or 1;

$R^1$ and $R^2$ are identical or different, and are each a $C_1$-$C_{40}$ radical, or $R^1$ and $R^2$ together with the atoms connecting them form a cyclic or polycyclic ring system optionally comprising at least one, identical or different, heteroatom selected from the group consisting of N, O, P, S and Si;

$R^3$ is hydrogen or a $C_1$-$C_{40}$ radical, wherein $R^3$ displays a lower steric hindrance than $R^1$;

$R^4$ is hydrogen or a $C_1$-$C_{40}$ radical, wherein $R^4$ displays a lower steric hindrance than $R^2$;

$R^5$ and $R^6$ are identical or different, and are each hydrogen or a $C_1$-$C_{40}$ radical; or $R^1$ and $R^3$, $R^2$ and $R^4$, $R^1$ and $R^5$ and/or $R^2$ and $R^6$ together with the atoms connecting them in each case form a cyclic or polycyclic ring system optionally comprising at least one, identical or different heteroatom selected from the group consisting of N, O, P, S and Si;

X is a single bond or a divalent group;

$Y^1$, $Y^2$ are identical or different, and are each oxygen, sulfur, selenium, tellurium, $NR^9$, or $PR^9$;

$R^7$, $R^8$, $R^9$ are identical or different, and are each hydrogen, a $C_1$-$C_{20}$-alkyl, a $C_2$-$C_{20}$-alkenyl, a $C_6$-$C_{22}$-aryl, or an alkylaryl or arylalkyl comprising from 1 to 10 carbon atoms in the alkyl radical and from 6 to 22 carbon atoms in the aryl radical; and $T^1$, $T^2$, $T^3$ and $T^4$ are identical or different, and are each hydrogen or a $C_1$-$C_{40}$ radical, or $T^1$ and $T^3$ and/or $T^2$ and $T^4$ together with the carbon atoms connecting them in each case form a cyclic or polycyclic ring system optionally comprising at least one, identical or different heteroatom selected from the group consisting of N, O, P, S and Si.

7. A process for preparing isotactic polyolefins by polymerizing at least one α-olefin in presence of the catalyst system prepared by the process according to claim 6.

* * * * *